United States Patent
Forsberg et al.

(10) Patent No.: US 7,373,787 B2
(45) Date of Patent: May 20, 2008

(54) PORTABLE, POTABLE WATER RECOVERY AND DISPENSING APPARATUS

(75) Inventors: Francis C. Forsberg, San Antonio, TX (US); Clayton Colbert, Los Angeles, CA (US)

(73) Assignee: Worldwide Water, L.L.C., Las Vegas, NV (US)

(*) Notice: Subject to any disclaimer, the term of this patent is extended or adjusted under 35 U.S.C. 154(b) by 0 days.

(21) Appl. No.: 11/464,132

(22) Filed: Aug. 11, 2006

(65) Prior Publication Data

US 2007/0039345 A1  Feb. 22, 2007

Related U.S. Application Data

(63) Continuation of application No. 10/505,535, filed as application No. PCT/US02/05636 on Feb. 25, 2002, now Pat. No. 7,089,763.

(51) Int. Cl.
   *F25D 21/14* (2006.01)
(52) U.S. Cl. .................. 62/285; 62/93; 62/272
(58) Field of Classification Search .......... 62/93, 62/150, 285, 291, 317, 272
   See application file for complete search history.

(56) References Cited

U.S. PATENT DOCUMENTS

| | | | |
|---|---|---|---|
| 3,675,442 A | 7/1972 | Swanson | |
| 4,204,956 A | 5/1980 | Flatow | |
| 4,351,651 A | 9/1982 | Courneya | |
| 5,106,512 A | 4/1992 | Reidy | |
| 5,149,446 A | 9/1992 | Reidy | |
| 5,203,989 A * | 4/1993 | Reidy | 210/137 |
| 5,227,053 A | 7/1993 | Brym | |
| 5,259,203 A | 11/1993 | Engel et al. | |
| 5,301,516 A | 4/1994 | Poindexter | |
| 5,315,830 A | 5/1994 | Doke et al. | |
| 5,517,829 A | 5/1996 | Michael | |
| 5,553,459 A | 9/1996 | Harrison | |
| 5,669,221 A | 9/1997 | LeBleu et al. | |
| 5,701,749 A * | 12/1997 | Zakryk | 62/93 |

(Continued)

FOREIGN PATENT DOCUMENTS

EP    0597716 A1    5/1994

(Continued)

OTHER PUBLICATIONS

NSF International, NSF Standards for "Drinking Water Treatment Units", 1995, cover page and pp. 32-34, NSF International, Ann Arbor, Michigan, USA.

*Primary Examiner*—Melvin Jones
(74) *Attorney, Agent, or Firm*—Cox Smith Matthews Incorporated

(57) ABSTRACT

A portable, potable-water generator for producing high-purity liquid water by condensation of water vapor from ambient air. The generator employs an air filter to remove particulates and aerosols from the incoming air. An enclosed heat absorber cools the filtered air to its dew point and collects droplets of condensate into a condensate collector. Before discharge, the collected dew is treated in a bacteriostat loop to destroy adventitious living organisms and to filter out undesirable and dangerous contaminants. A recirculation loop provides the ability to recirculate stored condensate, including during periods of inactivity. Further, quick disconnect fittings and variable length flexible tubing allows use of the invention to serve remote dispensers and/or appliances and allow use of municipal water treated through the apparatus in low condensate situations.

43 Claims, 12 Drawing Sheets

U.S. PATENT DOCUMENTS

| | | |
|---|---|---|
| 5,704,223 A | 1/1998 | MacPherson et al. |
| 5,845,504 A | 12/1998 | LeBleu |
| 6,029,461 A | 2/2000 | Zakryk |
| 6,058,718 A | 5/2000 | Forsberg et al. |
| 6,182,453 B1 | 2/2001 | Forsberg |
| 6,209,337 B1 | 4/2001 | Edwards |
| 6,227,003 B1 | 5/2001 | Smolinsky |
| 6,237,352 B1 | 5/2001 | Goodchild |
| 6,289,689 B1 | 9/2001 | Zakryk |
| 6,588,226 B1 | 7/2003 | Semrow et al. |
| 7,089,763 B2 | 8/2006 | Forsberg et al. |

FOREIGN PATENT DOCUMENTS

EP 1239232 A1 9/2002

* cited by examiner

PORTABLE, POTABLE WATER RECOVERY AND DISPENSING APPARATUS

CROSS-REFERENCE TO RELATED APPLICATIONS

This application is a Continuation of U.S. patent application Ser. No. 10/505,535 filed Aug. 23, 2004, now U.S. Pat. No. 7,089,763 which is the U.S. National Phase of PCT International Application No. PCT/US02/05636 filed on Feb. 25, 2002, the disclosures of which are incorporated herein by reference.

FIELD OF THE INVENTION

This invention relates to a portable, potable water generator/dispenser capable of recovering liquid water for human use from the humidity of environmental air and sanitizing it for human use. The water generator of this invention draws in moisture-laden air from the surroundings and recovers liquid water by cooling the stream of air to below its dew point. The unit can be powered from electrical mains, single/3-phase, or portable generators, AC, 110-220 V, 50-60 Hz, DC power 60 V batteries or solar charged batteries. The preferred embodiment of the apparatus includes air filters of various types which remove suspended pollen or dust particles so that contaminants and undesirable impurities from the environmental air are not carried into the dew-forming section. The apparatus also includes heating and cooling devices, and ionizing and oxygenating subsystems. The most important feature of the basic unit and its variants are filtration and sterilization systems which provide purified liquid water free from contaminants and volatile organic compounds (VOC) as defined by National Science Foundation (NSF) Standard 53.

The external enclosure of the present apparatus may be a compact, attractive furniture-type wheeled design, one embodiment of which is further adapted to prevent or discourage entry of insects. The water generators of this invention employ ruggedized design and construction and certain embodiments are intended to operate unattended for extended periods in harsh, military-type environments such as peacekeeping actions, fires, earthquakes and weather disasters/emergencies. Emergency-use embodiments are prepared with a feed valve manifold connected to an input port, this permits selected or additional inputs of water from any source, such as a swimming pool, in emergency conditions such as a natural disaster. Other embodiments are intended to operate in land-transport vehicles, e.g., off-road, bus, train, seagoing vessels, recreational vehicles, business or home office environments. Further hybrid embodiments lend themselves to incorporation into icemakers, refrigerators, drink coolers, water coolers, window air conditioners, etc. Another embodiment includes an automated pressurized valve manifold, equipped with sensors to detect the amount of water being generated, connected to a pressurized municipal water supply to provide for admission of municipal water into the recirculating-purification system; this subsystem would be activated under atmospheric conditions which limit the generation of water from the environmental air. The manifold is pressurized either by the municipal water system or by an internal pump allowing for immediate dispensing of purified water at a drinking fountain or into a refrigerator's ice maker/chiller with or without electricity. Such embodiments include an electronic control, specifically a microprocessor, to sense critical operational parameters of the generator and to activate alternative modes of operation along with related visual and audible mode/status indicators. The electronic control also provides the timing to control recirculation within the apparatus to keep the water pure. When the storage tank is full there is also provision, which is automatically controlled, for actuating an electrically or manually operated valve to direct excess water being generated into an additional system or storage vessel. Still further, compact luggage-type embodiments can be provided for travel or sports use.

An air filter is used to remove suspended pollen or dust particles so that contaminants and undesirable impurities are not carried into the dew-forming section. The apparatus may have municipal water connected by quick disconnect fittings so it may be purified, filtered and dispensed when there is insufficient condensate. Both the condensate and the municipal water is filtered by a water filter certified to meet NSF-53 standards. The water from collected condensate and/or the municipal water is also purified in a bacteriostat which contains appropriate bacteria killing devices such as an ozone generator or an ultraviolet light. Further, the apparatus is a size and weight which makes it readily portable and capable of being hung on a wall, or placed on a sink top, in the attic, garage or other convenient location favorable for producing condensate. The apparatus has quick disconnect fittings for attaching one or more remote dispensers by flexible tubing. This embodiment also provides a recirculation loop and a computer programmed timer to control the compressor's off/on or reversal time interval to maximize condensate collection when the evaporator is freezing due to environmental conditions. Digital counters and a digital display contain a humidistat and thermostat, operation indicator lights, and digital counters to indicate system operation or the need for a filter change. Further, the maximum condensate production for any model can only be determined by engineering tables and by testing the model in a controlled environment test chamber; such tests can include cyclical freezing and thawing of the evaporator and increasing the air flow over the evaporator. From the results of those tests, a computer program is written and programmed into a timer that controls the operation of the compressor for maximizing condensate. The results of the tests also enable the creation of a graph which exhibits expected water production at various temperature/humidity combinations.

Additionally, various embodiments can be fitted with an input port for impure water for priming, or a self-priming pump to avoid the need for priming, for increased output capacity and for operation under conditions when environmental temperature and/or, humidity do not allow enough water to be generated. Various embodiments also allow for tailoring a water generator for specific use to increase efficiency and decrease manufacturing costs.

BACKGROUND OF THE INVENTION

The consensus of most medical experts is that water supply is the single most critical factor to human health. Over 400,000 people were stricken, 4,000 hospitalized and over 100 people died in Milwaukee in 1993 from Cryptosporidium, a bacterial contaminant in their city-treated drinking water. Natural Resources Defense Council estimates that in the US alone more than 900,000 become ill each year from water-borne disease and as many as 900 will die. There is also an increasing awareness that "bottled water" itself may be no safer than municipally treated water. Some citizens feel protected by household-type water filters. However, of the over 2,000 types/styles/sizes of filters now being sold to the public for additional treating of city water, only a few remove significant amounts of parasites, viruses, bacteria, pesticides and heavy metals. While contaminated water is harmful to adults, infants and young children are at much greater risk from drinking impure water, particularly water with high levels of heavy metals or radioisotopes. Therefore, it is essential that a filter, such as an NSF 53-compliant filter, be used to remove impurities and VOCs. In addition, operation of a water generator in the vicinity of a pesticide plant or during insect spraying, either from the air or truck mounted units, could place VOCs in the generated water. Also, if a generator without an NSF 53 filter is producing water when its host house is sprayed for pest control, the water could be severely contaminated with VOCs.

While the situation is bad in parts of the United States, it is worse in many other developed countries and critical in third-world countries. In developing nations, there is often at least intermittent electricity but no source for potable water. For clinics and hospitals in such remote areas, doctors and technicians need purified water for scrubbing and to prepare medicines. In the case of remote villages in developing countries, there is a need for a unit which generates and dispenses purified water, is easily moved, is relatively inexpensive to manufacture and which can operate from a variety of types of electrical power with a minimum of maintenance.

The most common potable water dispenser for use in the home and office is the 20-liter glass or plastic bottle placed on a gravity-flow dispensing stand. The bottles usually provide processed spring or, well water and are generally sold with a representation of compliance with state and local health codes for potable water. One major drawback to "bottled water" is the fact that filled containers are heavy (approximately 25-30 kg) and awkward to change. Another problem is that algae can build up in the user's stand, necessitating periodic cleaning to maintain water purity. Relative to dissolved and suspended contaminants and undesired impurities, "bottled water" may be no safer than municipal water.

Today, 75% of American homes use chlorine-treated water. A problem that is just beginning to be recognized by the public is the reaction of chlorine with organic materials such as decaying vegetation. These reactions produce by-products known as halogenated organic compounds or trihalomethanes, which are known carcinogens. A recent study concluded that 18% of rectal cancers and 9% of bladder cancers can be attributed to by-products related to water chlorination.

At this time, the market for portable, potable water sources requires: (a) generation of high-quality water which is certifiably free of all impurities which are health hazards to infants and children in particular, (b) no necessity for storing and moving heavy bottles, (c) no requirement for expensive, complex maintenance procedures/cleaning, (d) low operating cost, (e) no special wiring/plumbing for installation, (f) attractive, office-furniture styling, (g) a more efficient water generator, (h) a low cost method of increasing the temperature/humidity range of condensate production, (i) a control and display panel indicating system operations, and (j) graphing abilities to indicate expected water production at various temperature/humidity conditions.

BACKGROUND ART

Current US Environmental Protection Agency (EPA) standards for impurities in primary and secondary drinking water are included as pp. 32-34 of the publication, "Drinking Water Treatment Units Certified by NSF International", NSF International, Ann Arbor, Mich. (1995). These 1995 drinking water-standards of US Environmental Protection Agency, ANSI/NSF-53, are included herein by reference. The specific analytical chemistry methods for each impurity covered by NSF-53 are described in EPA publications in the US Federal Register. There are several US patents that are relevant in the field of art.

U.S. Pat. No. 3,675,442, issued July 1972 to Swanson (Swanson-442);

U.S. Pat. No. 4,204,956, issued May 1980 to Flatow (Flatow-956);

U.S. Pat. No. 5,149,446, issued January 1991, to Reidy (Reidy-446);

U.S. Pat. No. 5,106,512, issued April 1991 to Reidy (Reidy-512);

U.S. Pat. No. 5,227,053, issued July 1993 to Brym (Brym-053);

U.S. Pat. No. 5,259,203, issued November 1993 to Engel et al. (Engle-203);

U.S. Pat. No. 5,301,516, issued April 1994 to Poindexter (Poindexter-516);

U.S. Pat. No. 5,517,829, issued May 1996 to Michael (Michael-829);

U.S. Pat. No. 5,553,459, issued September 1996 to Harrison (Harrison-459);

U.S. Pat. No. 5,669,221, issued 23 Sep. 1997 to LeBleu et al. (LeBleu-221);

U.S. Pat. No. 5,701,749, issued 30 Dec. 1997 to Zakryk (Zakryk-749);

U.S. Pat. No. 5,704,223, issued 6 Jan. 1998 to MacPherson (MacPherson-223);

U.S. Pat. No. 5,331,5830, issued 7 Apr. 1998 to Doke et al. (Doke-830);

U.S. Pat. No. 5,845,504, issued 8 Dec. 1998 to LeBleu (LeBleu-504);

U.S. Pat. No. 6,029,461, issued 29 Feb. 2000 to Zakryk (Zakryk-461);

U.S. Pat. No. 6,182,453, issued 6 Feb. 2001 to Forsberg (Forsberg-453);

U.S. Pat. No. 6,227,003, issued 8 May 2001 to Smolinsky (Smolinsky-003);

U.S. Pat. No. 6,237,352, issued 29 May 2001 to Goodchild (Goodchild-352); and

U.S. Pat. No. 6,289,689, issued 18 Sep. 2001 to Zakryk (Zakryk-689).

Except for LeBleu-221, LeBleu-504, and Forsberg-453, also owned by an entity affiliated with the Applicant herein, none of the water generators disclosed in these publications are designed primarily as a dispenser and, none are designed as portable units. Swanson-442 provides a large, heavy apparatus, and specifically teaches that small, portable units are relatively inefficient.

None of the above references disclose all or even a majority of the following features or embodiments, many of which are described herein as optional depending on the climate or conditions under which the generator is operated:

Integral, external fluid-delivery valves and controls;
Ion generator for discharged air stream;
Insect-resistant port covers/screens, access doors, edge joints;
Ultrasonic pest deterrent;
Ozone generator for water sterilization treatment;
Handle grips for easy movement by lifting or rolling;
Medical/food-handling-type tubing and joints for water handling subsystems;
Chemically-inert, thermally-conductive dew-collector surface films;

Working fluids in heat absorbers which comply with 1996-edition DOE, EPA and ASHRAE standards/regulations (such as refrigerant fluid 406A);

Ruggedized, long-life components and sub-systems;

Safe, convenient dispensing height for hot or cold water;

Electrostatic or conventional air filter with or without whistle alarm for blocked condition;

High Efficiency Particulate Air (HEPA) filter certified to remove pollutants to a size of 0.3 microns;

Night lights for controls and delivery valves for low-light situations;

Air-heating strip and fan (for outside units);

Water filter capable of meeting NSF-53 standards for VOCs;

Recirculation of water during periods of generation or on a predetermined time-interval or waterflow basis;

Provision for automatically-introducing municipal water during certain atmospheric conditions;

Provision for changing output vibrational frequency of ultrasonic pest control;

Provision for manual or automatic introduction of water from any source under emergency conditions;

Audible and visual operational status/mode displays;

Quick disconnect provisions for connection to existing appliances such as refrigerators, ice makers, and the like;

Remote location of unit from its dispensers;

Quick disconnect fittings to inlet water line for use of municipal water, after passed through the bacteriostat, when insufficient condensate is present;

Various lengths of flexible water lines having quick disconnect fittings encircled by a sleeve for easy connection of the apparatus to remote dispensers;

A leak detector which shuts off power if a leak is detected;

A unit made portable by its small size and weight;

A unit capable of mounting to a wall;

A unit with a thermostatically controlled heater to prevent freezing in exposed locations;

A means, including a quickly reversible refrigeration cycle, for alternately freezing and thawing the evaporator to produce condensate under normally undesirable conditions;

Alternate sterilization methods including ozone generators for purifying and treating discharged air and negatively charging water;

A UV canister optimally designed to require water flow through bacteria "killing zones" so as to maximized bacteria destruction;

A UV canister having sensors to permit sufficient water flow as will maintain a constant water level in a storage tank;

Provision for gravitational introduction of condensate from evaporator coils directly into a UV canister;

Provision for sealed, disposable UV canister;

An easily removable, easily cleaned storage tank;

A secure tube for introduction of medicines directly into the cold water tank;

Recirculation of water through storage tank and UV canister in isolation of a medicated/treated water;

Multiple solid-core charcoal filters for removing VOCs;

A means for mineralizing the pure condensate;

A self-priming pump that will not destruct if run dry;

A system to completely recirculate all water through the storage tank, UV canister, and all filters and components in a manner that disallows standing water;

A pump sufficiently strong enough to permit circulation of water through solid-core filters and still allow rapid external dispensation of water;

A heater for heating a room;

A heater for heating air passing over the evaporator;

Large wheels to facilitate movement of unit over uneven surfaces;

Ground fault interruption circuitry;

Multiple-speed squirrel cage fans;

A means for oxygenating the processed water;

NSF approved tubing rated at 400 p.s.i.;

An air freshener tray for adding a pleasant scent to air reintroduced into a room;

Child-proof valves for dispensing hot and/or cold water;

Dual on/off switches: one manually- and one electronically-activated;

Fuses and/or circuit breakers;

A membrane switch panel to control the power, operational mode, fan speed, display, and timer function;

A line so fitted as to permit attachment to a standard refrigerator ice maker;

Insulation on cold lines to prevent "sweating" and moisture build-up;

A unit of such size and weight as permits sink-top use;

A water-generating apparatus integrated into a typical window air-conditioning unit;

A means for purifying water by vaporization and condensation; and

A reverse-osmosis membrane filter, waste water from which may be recycled.

The patent publications noted above generally disclose: (a) industrial water-condensation units designed to be permanently-attached to building air ducts or (b) water purifiers, not portable dispensers with optimized UV canisters, and (c) not with a quickly reversible refrigerant cycle to maximize water collection in low humidity and temperature. Details of some of these references are as follows:

Reidy-512 discloses a fixed-position, large-volume, high-rate water generator suitable for supplying drinking water to an entire office building, laundry, etc. The device is described as "having ducts for bringing this supply of ambient air to the device and for releasing the air back outside the device after it has been processed". The attached, permanent "ductwork" is characterized further as "extending through an outside wall of the structure or dwelling". While sensors, indicators, interlocks, alarms for the UV lamps, air filters and water filters are mentioned briefly, other major components of the apparatus are usually characterized by single-word descriptions such as "air filter element", "evaporator coils", "condenser coils", etc. In both Reidy-512 and Reidy-446 patents, the drain is located on the base of his water generator, a position which makes the drains completely unsuitable for dispensing water unless the machine is placed on legs or mounted in a cabinet. Reidy-512 teaches two passes of water past ultraviolet light tube to kill bacteria whereas the present apparatus provides for automatic, continuing recirculation of the water in the final delivery tank through a UV bacteriostat zone. Reidy-512 has a number of additional limitations and shortcomings: the user must set the humidistat and thermostat. No provision is made for insect proofing of the cabinet; and the gravity flow water filter is located under the collection pan and is severely limited in both flow rate and minimum pore size by the gravity-feed pressure head. In the apparatus of the present invention, water flows through a filter under pressure from a pump; this allows for high rates and small-pore, filter/adsorption media such as a porous-carbon block in the NSF 53 certified filter. The present invention also provides that liquid may be dispensed directly from the apparatus without having to remove the storage tank whereas Reidy-512 requires that water be poured from the removed storage tank.

Poindexter-516 has no germicidal light nor a remote collection diverter valve. A drain is shown in FIG. 2 but none in FIG. 1. The drain is shown on the bottom of the apparatus which, if on the floor, is essentially inoperable and, if raised on a stand, makes a top-heavy unit which would require permanent wall anchors.

Engle-203 is essentially two tandem dehumidifiers. A second-stage compressor with its condenser coil immersed in the storage tank produces heated water. One familiar with the art realizes that such heated water would never reach 75 C as does the heated water in the present apparatus. A further problem of locating the condenser coil in the storage tank is that it prevents removal of the tank for cleaning without opening the refrigerant system. Still further maintenance problems arise from the positioning of drains, i.e., there are no external dispensing valves and the drain valves are poorly located for replacing the valves because of the limited access inherent in their location.

Poindexter-516 describes a stainless-steel air-cooling coil and collection pan which adds significantly to the cost of manufacturing and does not specify the specific type of stainless steel, 314L, which is required for water handling in production facilities. The specification goes into great detail on the types of chemicals usable to clean areas which contact the water. In the present apparatus, the storage tank is completely removable and the condensate is sanitized by passing under the germicidal light several times.

Harrison-459 uses a UV lamp tube to treat the discharge water stream. This indicates that bacteria and or algae may be growing within the unit or its plumbing connections. This unit also must be primed initially with approximately 10 liters of start-up water which can be a source of initial contaminants, such as VOCs which are neither removed nor broken down by either UV radiation or granular carbon charcoal. Whether this technology is compliant with NSF-53 remains a question. In the device, the compressor operates to maintain a cold set-point temperature within the water tank, i.e., the compressor operates to cool the fluid remaining in the tank even when the device is not actively producing water condensate. In contrast, the present invention saves energy by shutting off when it is not producing water. Further, the present invention may include a wheeled, furniture-type, user-friendly cabinet complete with carrying handles, disposable cups, related holders, diverter valve and air-filter blockage alert. Also, since the present invention is fitted with a gravity discharge or pressurized line, it is possible to draw water even in the event of a power failure. The Harrison-459 unit, which employs an electric solenoid valve, would not be able to deliver water in the absence of electrical main power.

Swanson-442 suffers from many of the same deficiencies as Harrison-459; further, it also lacks an air filter or a UV disinfecting system. While Swanson-442 discharge device is shown on one figure, the location and operating parameters are not specified.

Brym-053 provides a UV-activated catalyst water purifier/dispenser for tap water (well or public supply) which can be installed below the counter or enclosed in a cabinet. This unit merely treats water supplied to it, and in the process, a certain portion of the incoming flow is diverted to waste.

Michael-829 is primarily a device for producing and filtering "drinking" water across "activated charcoal" and a "plastic mesh micropore filter". It is probably not compliant with NSF-53 standards for VOC removal. Further, it has no provision for continuing circulation of water in order to maintain purity, heater fan and/or hot-gas bypass.

The prior patents cited above generally use a typical refrigerant deicer system to keep their evaporators from freezing under low condensate flow rates, which can occur with cool ambient air. For example, Reidy-512 patent describes water production cessation at about 10 C. This limitation occurs because: (a) obtaining condensate is inefficient, (b) condensation is not cost effective at such low temperatures and (c) the evaporator tends to freeze over at lower temperatures. This limitation also occurs because of the design of the water generating device using a typical hot-gas bypass deicer which is not computer controlled for temperature/humidity combinations.

All of the devices cited are large capacity refrigerant gas dehumidifiers. The refrigerant gas from the compressor cools an evaporator coil and when ambient air is passed by the coil, moisture condenses out and drips to a collector below. When operated over extended periods or in cooler temperatures, the evaporator tends to freeze over due to low flow rate of condensate. In this situation, the compressor is designed to switch over to hot-gas bypass mode. A thermostat and/or humidistat control assists in determining when the compressor switches over. This on/off cycle during cooler temperatures drastically reduces production of water until the compressor eventually stops when temperature of incoming air is too low. However, the present system actually uses the freezing and thawing generated by quick reversal of the refrigeration cycle to produce condensate by one of several computer controlled options for alternately freezing and thawing condensate.

MacPherson-223 describes and claims a thermoelectric (TE) cooler attached to a medicine-cooler bag containing an insulin vial. Since the drug vial cooler disclosed is a non-circulating, closed, small-volume, sterile-fluid system, there are few similarities in structure or function compared to the present invention.

Zakryk-749 describes and claims a water cooler with a TE cooling junction integrated into the side walls of the holding tank. Because the TE apparatus of the invention is not described in detail, it is difficult to compare either its structure or function with the present invention.

Zakryk-461 is a CIP of Zakryk-749. It further describes and claims the water cooler of the Zakryk-749 patent which further includes a water filter assembly. Again, however, the apparatus is not disclosed in detail, making it difficult to compare either its structure or function with the present invention.

Zakryk-689 further describes and claims the water cooler of the above Zakryk patents to include a sediment filter assembly. Here again, the apparatus is not technically described in a manner that would allow comparison of either its structure or function with the present invention.

Doke-830 describes and claims a TE apparatus integrated into an insulated picnic or food-transport container. Because the invention includes an air-circulation fan through the wall of the container, it is distinguishable in structure and function from the present invention.

Smolinksy-003 describes and claims a typical reversible heat pump system enabled to collect, under certain conditions, excess refrigerant to improve efficiency. The described apparatus does not extract water from air as does the present invention. The present invention, although utilizing in some embodiments a typical reversible heat pump system, does not provide for a tank for excess refrigerant. Rather, the present invention utilizes a flow rafter to increase cooling efficiency.

Goodchild-352 describes an apparatus for generating water from air and dispensing potable water, and further claims a hot gas injection system to prevent freezing of condensate on the evaporator such that generation of water from ambient air at temperatures as low as 50° F. is enabled. The present invention, in contrast, uses a flow rafter expansion valve to encourage freezing of condensate on the evaporator, and then reverses the heat pump cycle to thaw the condensate, or ly uses a heating strip to raise the temperature of the air passing over the evaporator.

Finally, Forsberg-453 describes the basic apparatus upon which the present invention improves. The present invention further claims an UV canister optimally designed for maximum bacteria destruction, as well as means for medicating, mineralizing, and oxygenating the extracted water. Worldwide Water, Inc., the owner of Forsberg-453, is affiliated with the Assignee/Applicant of the present invention.

DISCLOSURE OF THE INVENTION

The present invention is an apparatus to generate drinking water by condensation of moisture from the atmosphere. Alternative embodiments allow tailoring of the system for maximum production and efficiency in varied climates, temperatures and/or settings. Various options for obtaining pure water are utilized as it becomes increasingly more difficult to remove moisture from low humidity or temperature atmospheric conditions. In low humidity conditions, provision is made for automatically purifying municipal water. The system also utilizes the tendency of evaporators to freeze at lower temperatures. By specifically controlling the freezing and thawing, condensate can be produced in temperatures lower than the temperature at which most dehumidifiers automatically turn off.

The water generator of the present invention operates within a closed housing and incorporates dispensing subsystems to deliver water directly to the external dispensing valves. It is not necessary to open the housing every time a small quantity of water is desired. The housing panels and various openings of outdoor embodiments of the present invention are fitted with tight-sealing flanges to prevent insect infestation and environmental contamination of the water; alternatively, such units may be fitted with an ultrasonic insect deterrent. Any dispenser that is designed to work in remote, harsh environments must be designed so that the outside envelope is infrequently opened and then only for maintenance.

The dew-forming surfaces of the present invention are preferably plated with gold to increase the rate of heat transfer. Metals other than gold may be used to achieve a similar result. For example, silver plating works just as well, but tends to oxidize in an unsightly fashion. However, such plating is a vast improvement over the prior art of coating the dew-forming surfaces with food-grade materials such as Teflon®, which tend to reduce (i.e. insulate) rather than increase the rate of heat transfer.

For embodiments intended for use in a home or office, certain of the insect and dust-sealing features may be omitted and the cabinet implemented with attractive, furniture-type styling. To make the present water generator-dispenser more desirable for office or home use, the unit can be fitted with subsystems for producing water at three temperatures, i.e., hot, cold and ambient. Cooling of the water is accomplished by adding a secondary heat absorber source; this absorber may incorporate reverse-cycle cooling or other alternatives such as Peltier-effect or chemical/magnetic cooling effects. Insulation may be provided to surround the cold refrigerant lines of the secondary heat absorber source to reduce or eliminate moisture "sweating" and buildup inside of the housing. Another method of chilling water is by incorporating a thermoelectric probe-module as a second heat absorber; the unit is mounted on the outside of the tank and cooled by a fan.

To produce hot water, a heating element is placed within a heated, food-type, stainless steel tank with an insulating jacket is added. An alternate method of supplying heated water for delivery from an external valve is to provide an in-line, resistance-heated tube of sufficient length to heat water being delivered from the cold-temperature zone of the cold water tank to the hot-water external valve. Also, an electrically or manually controlled diverter valve may be installed to allow pumping into a container outside the housing. Incorporated is a secure tube to permit introduction of medicines and/or vitamins into a separate water tank in fluid communication with the storage tank. This feature is particularly helpful in undeveloped regions where mass medical treatment of an entire household or village is desired; accordingly, the bulk water may be treated via the secure tube. The present invention permits recirculation of the condensate without disturbing the medicinated/treated water. For convenience, the storage tank is easily removed: the storage tank lid has attached to it all of the storage tank sensors, which lid is lifted out of the way to permit removal of the storage tank tub without disconnecting either connected tubing or sensors.

The present invention is adapted to be connected to municipal water to provide treated water even in conditions when it is not possible to provide a sufficient quantity of water by condensation, and is further adapted to be able to accept, under emergency conditions, water from a source such as a swimming pool and purify it to emergency drinking-water standards for a temporary period. Accordingly, a membrane filter or solid core charcoal filter to remove heavy metals and other toxic substances is connected in line with the external water inlet to ensure purity. The present invention may be so embodied that water purity may be obtained by vaporizing incoming water for passage over the water-condensing surfaces and so into the circulation of the system. For added health benefit, an oxygenator may be included to introduce oxygen into the water prior to dispensation.

The preferred embodiment of bacteriostat of the present invention is an ultraviolet light (UV) canister designed to optimize the killing effect of the UV radiation. The canister is shaped to surround a UV-radiating bulb so as to direct the liquid condensate into the zone of effective bacteria destruction. The interior surfaces of the canister walls are coated with a highly reflective material. This reflective feature is primarily to reflect UV radiation back into the "killing" zone to so intensify the destructive aspect of the UV radiation, and to prevent degradation of the material of the structure of the present invention by such radiation. The UV canister may be provided in a sealed, disposable unit so placed for quick replacement of the UV canister without the necessity of opening the sealed housing.

An alternate embodiment of the present invention incorporates an attractive closed housing which is considerably smaller than the basic embodiment of the invention. The invention is much lighter incorporating only the essential features necessary for producing and dispensing water. To enable a smaller housing and lighter device, the UV bulb is placed within the storage tank.

In another embodiment, the present invention is adapted for integration with a typical window air-conditioning unit. The evaporator of the air-conditioning unit coincides to the dew-forming surfaces of the present invention; the remaining components of this embodiment are fitted into an enlarged air-conditioning unit platform. Alternatively, the apparatus is separately attachable to a window air-conditioning unit so as to enable use of the present invention with different models of window air-conditioners. Water is generated when the air-conditioning unit is in use.

To achieve water production in lower temperatures, the unit is allowed to freeze and thaw. Optimally, a computer-controlled flow rafter expansion valve is physically installed in addition to the typical expansion valve, but utilized in the alternative, to lower the pressure of the refrigerant in the evaporator and thereby encourage the freezing of the condensate. The refrigeration cycle is then quickly reversed to heat the dew-forming surfaces thereby thawing the frozen condensate. The thawed condensate drips into the collector, and water-bearing air is again passed over the dew-forming surfaces to be frozen again in cyclical fashion. In an alternative preferred embodiment, the thawing of the frozen condensate may be done by hot gas reversal, varying head pressures, and/or heaters.

If there is insufficient water production or if it is desired to attach the unit to a home refrigerator ice maker/chiller, a municipal water inlet line may be incorporated by quick disconnect fittings. Accordingly, municipal water pressurizes the refrigerator's dispensing system by passing municipal water through the NSF 53 filter and before reaching a storage tank. Further, a recirculation loop is employed to enable circulation of purified water into the UV canister to prevent bacteria build-up. Remote dispensers are connected to the apparatus by flexible tubing having quick disconnect fittings. The distance between the apparatus and its remote sensors may accordingly be varied by simply changing the length of flexible tubing. A sleeve encircles the flexible tubing such that the tubing may neatly and unobtrusively be attached to a wall. To prevent dust and pollen from entering the system, a High Efficiency Particulate Air (HEPA) filter or other electrostatic air filter is used. An air ionizer may be used to further assist in removing particulate matter from the intake air and treating the discharged air. Because the water generated is so pure, it may also be desirable to add minerals into the water. Accordingly, a mineralizing cartridge may be placed into the recirculation loop to achieve the desired mineral concentration.

The water generator/dispenser of the present invention fills a long-felt need for emerging countries and indeed marry places in the world. The objects and advantages of the present invention include:

(a) providing a means for obtaining and dispensing potable water from a portable apparatus that is consistent with the decor of an office or home yet requires no permanent external plumbing or air duct;

(b) providing an apparatus for heating and chilling potable water collected from the atmosphere;

(c) providing an apparatus which can operate indoors or outdoors so as to be available to operate in remote areas;

(d) providing an apparatus which can easily be assembled from sealed, ruggedized modules;

(e) providing a cabinet apparatus with small or large wheels that is portable, i.e., can be rolled about on packed earth, pavement, bare floor, carpeted surfaces, or uneven surfaces;

(f) providing an apparatus which can be operated from a DC electrical supply by attaching solar-electrical generating panels or by variable-frequency, variable AC voltages, single- or 3-phase mains power, 50/60 Hz or AC electrical power generated from wind-driven generators;

(g) providing an apparatus that has minimal chance of water contamination from VOCs, insects or rodents;

(h) providing an apparatus of simple modular construction designed for operation over extended time periods without operator attention;

(i) producing high-quality, purified water on-demand and/or at timed intervals by preparing the unit with medical-grade, NSF rated, 400 p.s.i. tubing and including an inert surface coating on the dew-forming surface;

(j) producing liquid-water condensate at low air temperatures just above freezing by use of an air-heating strip, hot gas bypass, or utilization of a reversible refrigeration cycle;

(k) dispensing potable water at a convenient height for adults or children or persons in wheelchairs;

(l) producing contaminant-free potable water while running unattended in open air for extended periods of a month or more above freezing temperatures;

(m) producing high-quality, potable water in varied environments such as offices, houses, or undeveloped locations;

(n) providing a water generator/dispenser which is easily portable both indoors and outdoors;

(o) providing options for dispensing potable water at three different temperatures, ambient, approximately 5 C cool and approximately 80 C warm;

(p) producing potable water near or below the cost per gallon of bottled water;

(q) producing high-quality potable water within latest ASHRAE and US federal standards for cooling and refrigerant apparatus;

(r) providing a water generator/dispenser that can be easily transported by two adults using integral carrying handles;

(s) providing a water generator/dispenser in which the exhausted air is filtered to remove dust, pollen, and airborne particles;

(t) providing a water dispenser from which incoming air is charged with negative ions to facilitate particle separation, and negatively charge the discharged air;

(u) providing a water generator/dispenser which will not produce or deliver condensate if the subsystem for killing microorganisms fails;

(v) providing a water generator/dispenser having easily changed air filters;

(w) providing a means without permanent plumbing to connect the apparatus to remote dispensers;

(x) providing a means, without permanent plumbing, for connecting municipal water to the apparatus such that municipal water is automatically dispensed after purification if there is insufficient condensate;

(y) providing a recirculation loop to periodically circulate treated water to prevent bacteria in response to a predetermined command, in a manner that allows no storage tank water to remain uncirculated;

(z) providing an apparatus which is sized to facilitate moving, and mounting on a wall or upon a sink top;

(aa) providing an apparatus with a combined condensate collector and storage tank;

(bb) providing a means for protecting the apparatus from freezing;

(cc) providing a sleeve for encircling exposed flexible tubing;

(dd) providing a means for automatically activating and deactivating the pump upon the opening/closing of a dispenser;

(ee) providing a means for automatically activating freezing and thawing cycles to produce maximum condensate for various marginal temperature/humidity conditions;

(ff) providing audible and visual operational status/mode displays;

(gg) providing an ozone generator for purifying and treating discharged air;

(hh) providing a UV canister optimized for maximum bacteria destruction;

(ii) providing a secure tube for introduction of medication into the extracted water;

(jj) providing for a recirculation system that does not disturb medicated water;

(kk) providing for an easily removed, easily cleaned storage tank with self-sealing gaskets;

(ll) providing for multiple solid-core charcoal filters for removal of VOCs;

(mm) providing for mineralization of the extracted water;

(nn) providing a self-priming pump that will not destruct if run dry, of sufficient pressure capability to enable use of solid core filters;

(oo) providing an integral heater for heating a room;

(pp) providing high voltage ground fault interruption circuitry;

(qq) providing low voltage components;

(rr) providing for reduction in noise by use of multi-speed squirrel cage fans;

(ss) providing an oxygenator for adding oxygen to extracted water;

(tt) providing an air freshener means for scenting air reintroduced to a room;

(uu) providing for child-proof safety valves;

(vv) providing for both manually and electronically operated power switches;

(ww) providing for fuses and/or circuit breakers;

(xx) providing for easily cleaned electrical membrane switches;

(yy) providing for insulation of cold lines to reduce or eliminate "sweat" or moisture buildup;

(zz) providing a means for attachment and use of a typical refrigerator-mounted ice maker;

(aaa) providing for reduction in noise by use of a hermetically sealed compressor cover;

(bbb) providing for a gold-plated dew-forming surface for enhanced heat transfer, or other such metal for similar result;

(ccc) providing for purification of water by vaporization;

(ddd) providing for integration of a water-generating apparatus with a typical window air-conditioning unit; and (eee) providing for sealed, disposable UV canister.

Still further objects and advantages will become apparent from a consideration of the ensuing description and drawings.

DETAILED DESCRIPTION OF THE PREFERRED EMBODIMENT

The elements and components of the present invention lend themselves most particularly to application and use in conjunction with a system of the type described in detail in U.S. Pat. No. 6,182,453, issued to Frank Forsberg and assigned to Worldwide Water, Inc., the entire disclosure of which is incorporated herein by reference. Nonetheless, it will be recognized by those skilled in the art how these elements and components may be applicable to use in conjuction with a variety of other of such moisture extraction systems.

Figure 3:
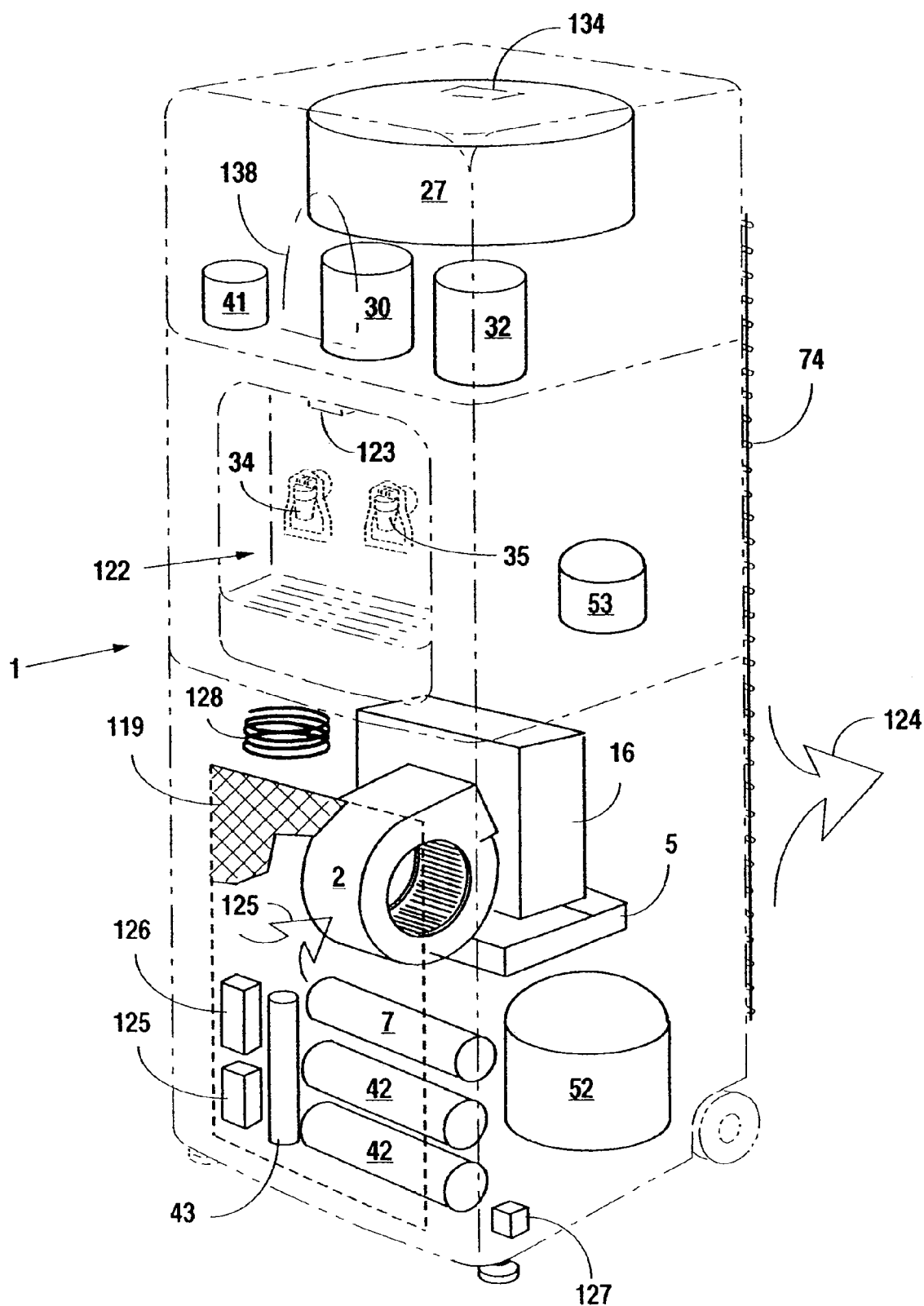
FIG. 3 is a view of a unit of the present invention depicting the housing, and the arrangement of various elements.
Figure 4:
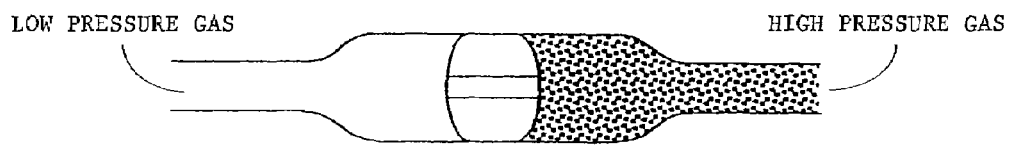
FIG. 4 is a depiction of a typical flow rafter expansion valve as utilized in the present invention.
Figure 6:
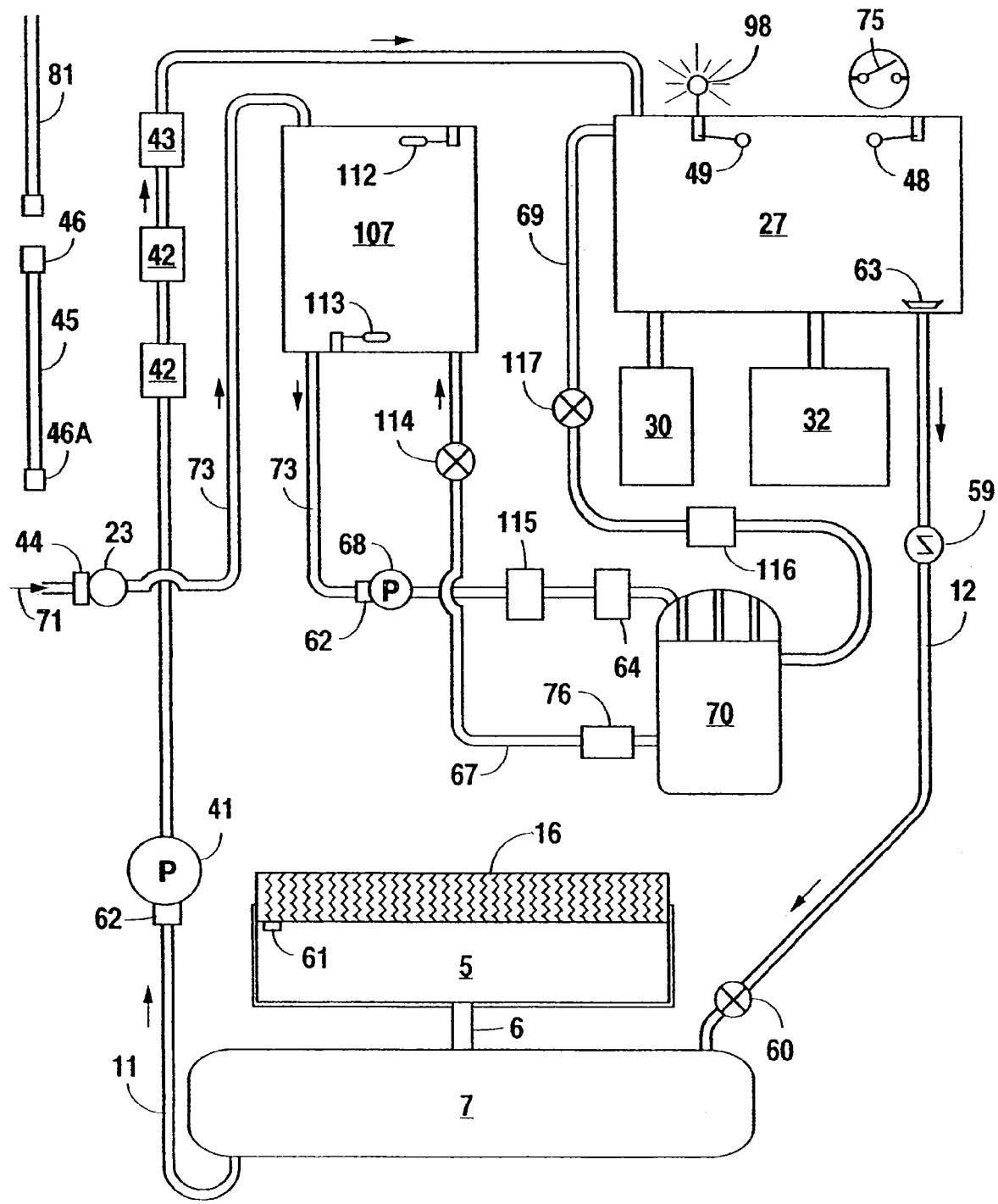
FIG. 6 is a schematic flow diagram of an embodiment of a system of the present invention utilizing a reverse-osmosis membrane filter as a water filtration means where waste water from the membrane filter is reclaimed.
Figure 7:
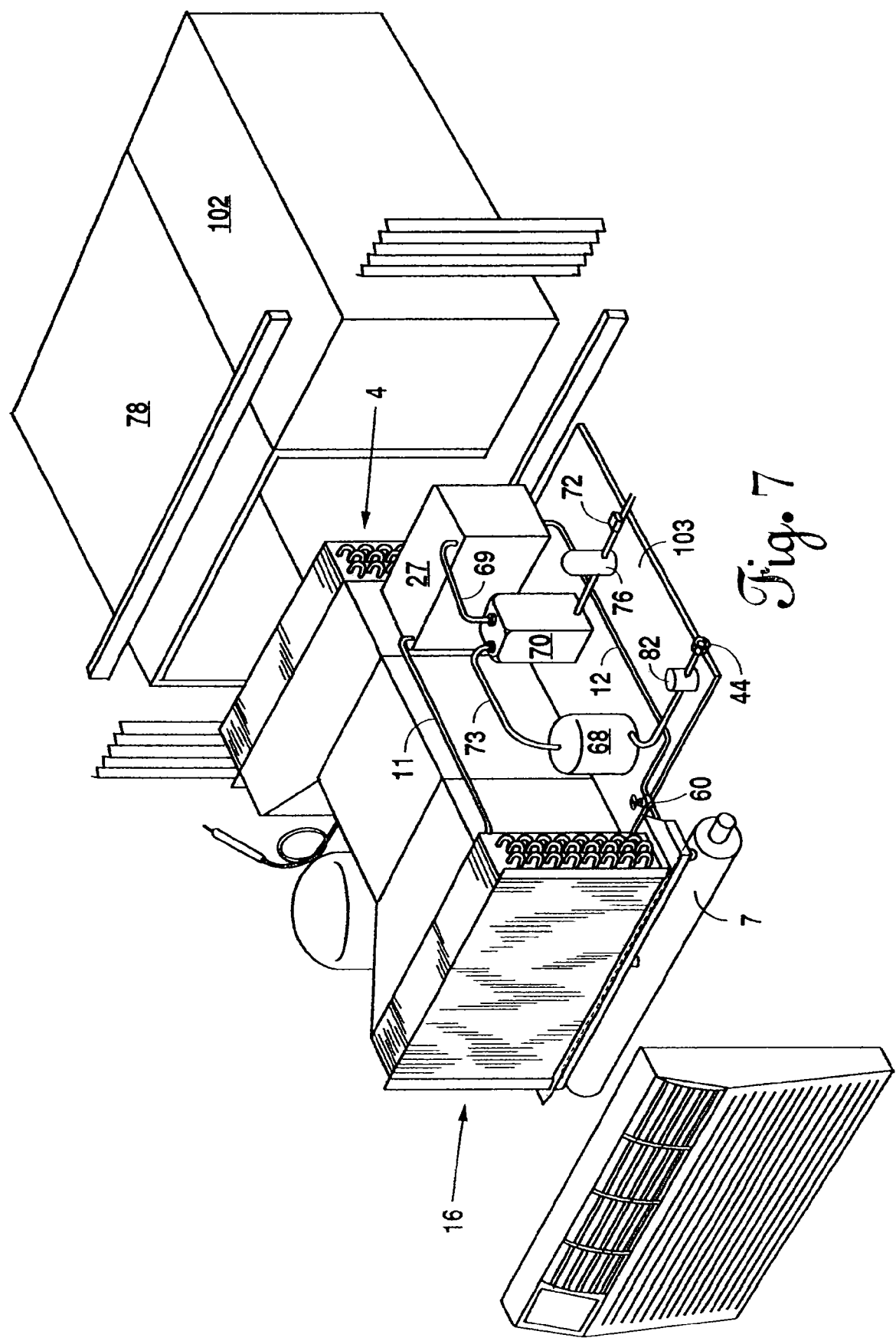
FIG. 7 depicts a typical window air-conditioning unit having an integrated water generating and filtration system of the present invention including a membrane filter and pump, further adapted for intake of externally-supplied water to supplement condensate generation.
Figure 8:
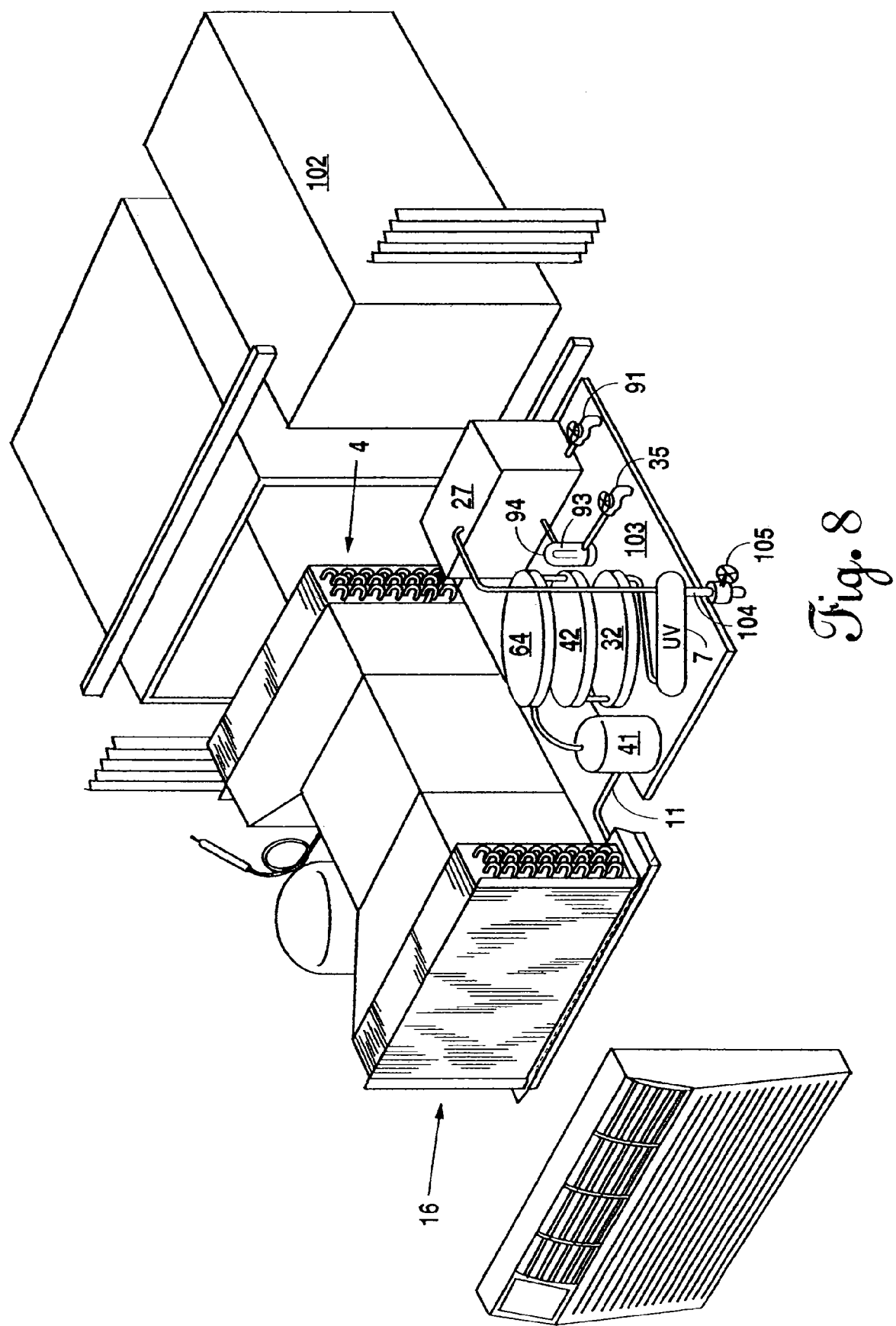
FIG. 8 depicts a typical window air-conditioning unit having an integrated water generating and filtration system of the present invention that includes a solid-core charcoal filter, a cold water tank with an integrated Peltier ice finger, and spigots for dispensing water.
Figure 9:
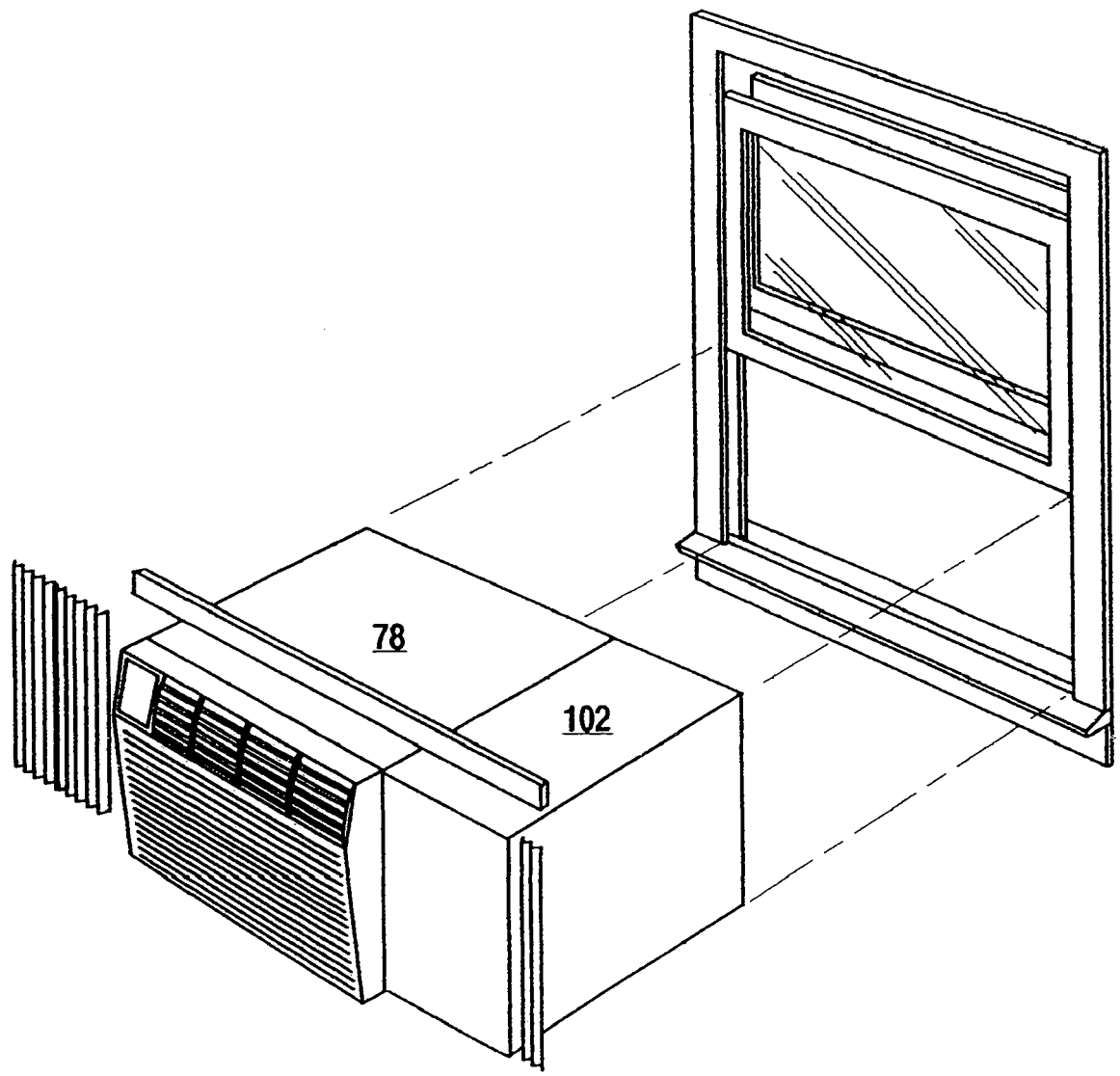
FIG. 9 depicts the placement of an enlarged, assembled typical window air-conditioning unit, into which the present invention has been integrated, in a typical window.
Figure 10:
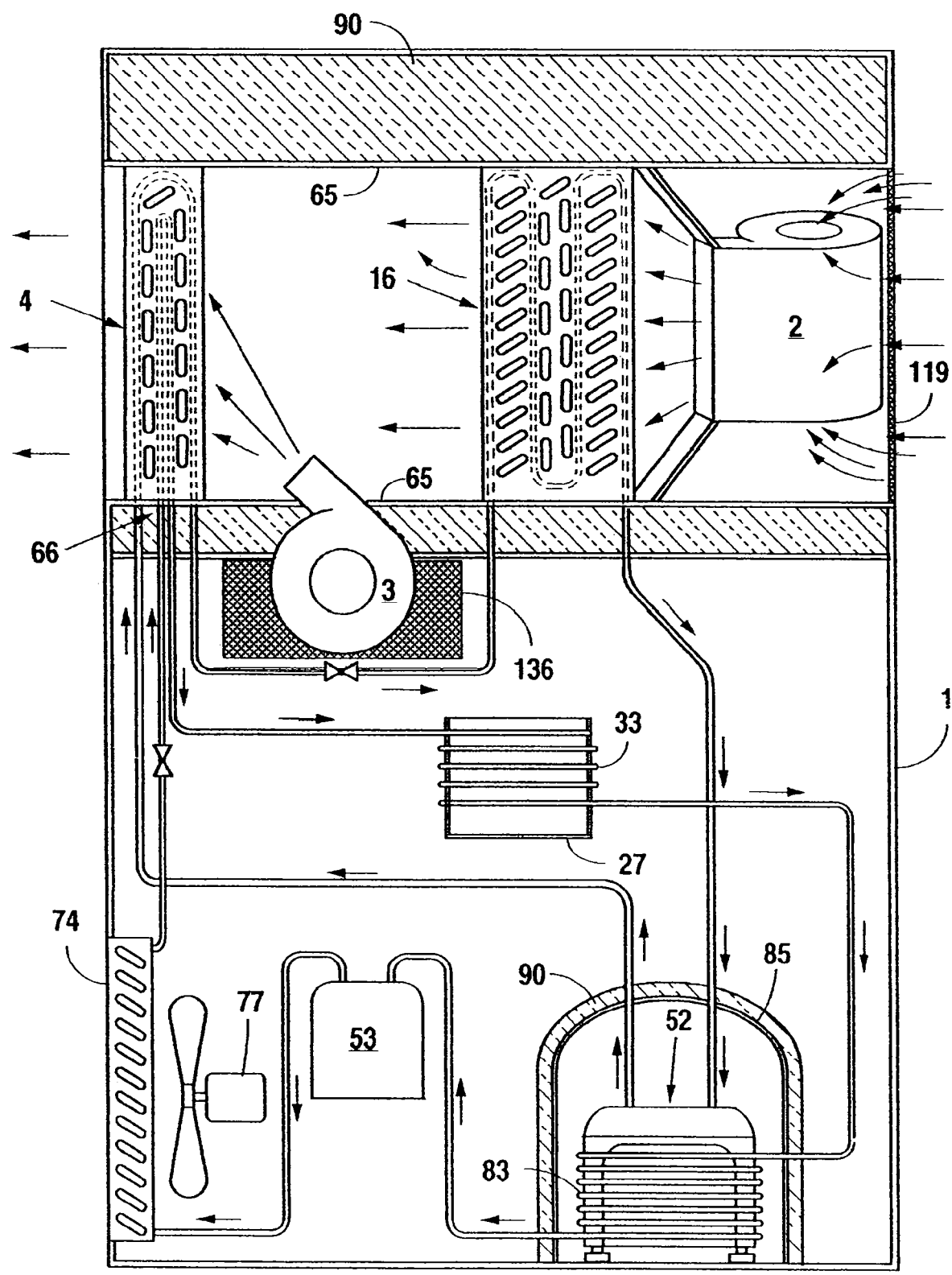
FIG. 10 is a schematic diagram of an embodiment of a system of the present invention wherein cooled air from a refrigerant evaporator passes over a refrigerant condenser to remove heat from the condenser, and a hermetically sealed compressor cover reduces compressor noise and increases compressor efficiency.
Figure 11:
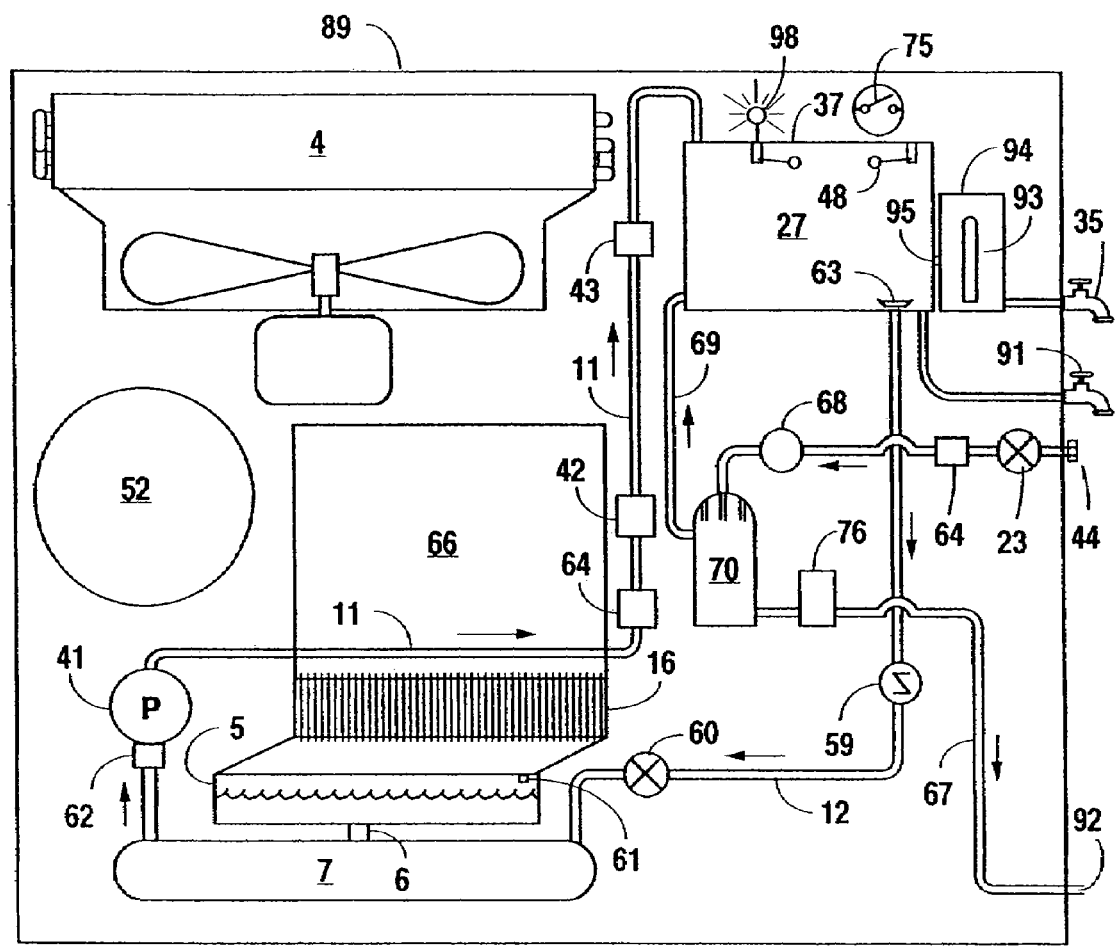
FIG. 11 is a schematic flow diagram of a countertop-sized system of the present invention utilizing a reverse-osmosis membrane filter as a water filtration means.

Table 1 below includes a listing of all special and standard nomenclature used in this specification; the column headed "Indicia" shows the reference number of each feature or element and the column headed "Figure" indicates the figure where the feature or element is first shown. The water collection and treatment processes of the present invention are generally shown in FIGS. 1, 1A, 2, 5, and 6. FIG. 4 is a simplified depiction of a flow rafter expansion valve used for reduction of pressure of refrigerant in the low-pressure side of water-generation system so as to induce freezing of the evaporator. FIG. 7 depicts a water-generating apparatus, capable of intaking external water, integrated into a typical air-conditioning unit, having a membrane filter and Peltier ice finger. FIG. 8 depicts the air-conditioning unit embodiment utilizing solid-core charcoal filters in place of a membrane filter system. FIG. 10 shows a heat exchanger arrangement wherein both the cooled air passing from the refrigerant first evaporator 16 and the low-pressure refrigerant line to second compressor 53 assist in removing heat from the first condenser 4, and the placement of cooling coils around first compressor within a hermetically sealed cover. FIG. 9 depicts the placement of a water-generating/window air-conditioning unit within a typical window. FIG. 11 portrays the elements of a sink-top sized water-generating apparatus. FIG. 3 demonstrates the position of wheels relative to the housing. FIG. 6 depicts a flow diagram for a membrane filter waste water recycling system.

As may be seen in FIG. 3, the working components are enclosed in a housing 1 with a top cover, four vertical side panels and a base. The housing may incorporate a bracketed opening in the front cover panel opening through which is inserted an air filter 119. The housing may further incorporate a front wall alcove opening and assembly 122 consisting of an alcove shell, grid and waste water receptacle. Above the alcove is a low-light-level lamp 123, or "night light". The alcove may also contains a fluid delivery controls 34 & 35 for dispensing water. One panel of the housing has an inlet opening into the air filter 119. One panel of the housing provides an outlet port 124 for air exhaust. This opening has an insect-resistant screen (not shown) on the interior of the housing outlet port 124. An ozonator 125 is provided to further remove air-borne particles and treat the air. A keypad 134 located atop the housing provides a user of the present invention operational control over the present invention.

For added safety, ground fault interruption circuitry is utilized to protect both apparatus users and the high voltage compressors, heaters, and ballast transformers. The remaining components, such as pump, solenoid valves, indicator lights, etc., are low voltage (less than 35 V, and optimally between approximately 12 V and approximately 24 V). Fuses and circuit breakers protect all electrical components.

TABLE 1

Descriptive Nomenclature and Indicia

| Indicia | Description, function | FIG. |
|---|---|---|
| 1 | housing, case, cabinet | 10 |
| 2 | fan assembly, multi-speed intake, first evaporator | 10 |
| 3 | fan assembly, multi-speed intake, first condenser | 10 |
| 4 | first condenser, refrigerant, water-generating | 10 |
| 5 | collector, condensate | 1 |
| 6 | tube, condensate collector to UV canister | 1 |
| 7 | canister, UV | 1 |
| 8 | tube, vent | 1 |
| 9 | sensor, UV canister lower | 1 |
| 10 | sensor, UV canister upper | 1 |
| 11 | tube, sealed, UV canister egress, fluid transfer | 1 |
| 12 | tube, sealed, storage tank to UV canister ingress, recirculation | 1 |
| 13 | bulb, UV | 1 |
| 14 | wire, power transmission, ballast transformer to UV bulb | 1 |
| 15 | transformer, ballast, UV bulb | 1 |
| 16 | first evaporator, refrigerant, water-generating | 1 |
| 17 | cap, canister | 1 |
| 18 | holder, UV bulb | 1 |
| 19 | surface, mirrored, UV canister | 1 |
| 20 | switch, relay, pump | 2 |
| 21 | wire, power transmission, switch relay pump to upper UV canister sensor | 1 |

TABLE 1-continued

Descriptive Nomenclature and Indicia

| Indicia | Description, function | FIG. |
|---|---|---|
| 22 | wire, power transmission, switch relay pump to lower UV canister sensor | 1 |
| 23 | solenoid, external water intake, default-closed | 1 |
| 24 | valve, check, external water intake | 1 |
| 25 | tube, sealed, cold water tank to hot water tank | 1 |
| 26 | tube, sealed, stainless steel, storage tank to cold water tank | 1 |
| 27 | tank, storage | 1 |
| 28 | gasket, self sealing, hot water | 1 |
| 29 | gasket, self sealing, cold water | 1 |
| 30 | tank, hot water | 1 |
| 31 | element, heating, hot water tank | 1 |
| 32 | tank, cold water | 1 |
| 33 | coil, second evaporator refrigerant, cold water tank chilling | 1 |
| 34 | spigot, child-proof, hot water dispensing | 1 |
| 35 | spigot, cold water dispensing | 1 |
| 37 | lid, storage tank | 1 |
| 38 | gasket, storage tank | 1 |
| 39 | clasp, locking, storage tank lid | 1 |
| 40 | switch, on/off, hot water tank heating element | 1 |
| 41 | pump, self-priming | 1 |
| 42 | filter, solid-core charcoal | 1 |
| 43 | canister, mineral replacement | 1 |
| 44 | quick-disconnect, female, external water | 1 |
| 45 | tube, external/internal water dual-purpose | 1 |
| 46 | quick-disconnect, male, external water inlet solenoid engaging | 1 |
| 46A | fitting, typical household faucet | 1 |
| 47 | insulation, tank | 1 |
| 48 | switch, float, storage tank water level | 1 |
| 49 | switch, float, storage tank water level indicator light | 1 |
| 50 | connector, storage tank to fluid transfer tube | 1 |
| 51 | tube, medication/vitamin | 1 |
| 52 | first compressor, water-generating | 10 |
| 53 | second compressor, cold-water chiller | 10 |
| 55 | tube, water system to refrigerator ice-maker | 1 |
| 55A | quick-disconnect, solenoid engaging, external water inlet | 1 |
| 55B | quick-disconnect, refrigerator ice-maker engaging | 1 |
| 56 | port, tranlucent, UV visual indicator | 1 |
| 57 | line, cold, refrigerant, cold water tank coil entering | 1 |
| 58 | line, cold, refrigerant, cold water tank coil exiting | 1 |
| 59 | solenoid, recirculation, default closed | 1 |
| 60 | valve, manual bleeder, recirculation | 1 |
| 61 | sensor, condensate collector overflow | 1 |
| 62 | screen, sediment | 1 |
| 63 | sensor, storage tank, low water | 1 |
| 64 | pre-filter, external water | 5 |
| 65 | plenum, ambient air | 10 |
| 66 | heat exchanger | 10 |
| 67 | tube, waste water outlet | 5 |
| 68 | pump, booster, membrane filter | 5 |
| 69 | tube, membrane filter to storage tank | 5 |
| 70 | filter, membrane, reverse osmosis | 5 |
| 71 | tube, external water source | 1 |
| 72 | solenoid, waste water outlet, default closed | 5 |
| 73 | tube, external water to membrane filter | 5 |
| 74 | second condenser | 10 |
| 75 | switch, timer, external water intake | 5 |
| 76 | flow restrictor, waste water | 5 |
| 77 | fan, multi-speed, second condenser | 10 |
| 78 | air conditioning unit, typical window-mounted | 7 |
| 79 | quick-disconnect, waste water outlet | 5 |
| 80 | switch, pressure, waste water | 5 |
| 81 | tube, waste water drain quick-disconnect | 5 |
| 83 | coil, cooling, second evaporator | 10 |
| 84 | fitting, tee, water tube | 1 |
| 85 | cover, first compressor, hermetically sealed | 10 |
| 88 | valve, expansion, flow rafter | 4 |
| 89 | cabinet, countertop | 11 |
| 90 | insulation, noise abatement | 10 |
| 91 | spigot, ambient water dispensing | 8 |
| 92 | tube, waste water discharge | 11 |
| 93 | ice finger, Peltier | 8 |

TABLE 1-continued

Descriptive Nomenclature and Indicia

| Indicia | Description, function | FIG. |
|---|---|---|
| 94 | tank, ice finger holding | 8 |
| 95 | tube, fluid transfer, storage tank to ice finger holding tank | 11 |
| 98 | LED | 1 |
| 102 | cover, enlarged platform | 7 |
| 103 | platform, enlarged, typical window air-conditioning system | 7 |
| 104 | tube, UV canister drain | 8 |
| 105 | valve, UV canister drain | 8 |
| 107 | tank, recycle | 6 |
| 110 | tank, vaporization | 12 |
| 111 | solenoid, recycle | 6 |
| 112 | sensor, upper float | 6 |
| 113 | sensor, lower float | 6 |
| 114 | valve, check | 6 |
| 115 | filter, sand/sediment | 6 |
| 116 | post-filter, membrane filter | 6 |
| 117 | valve, check, post-membrane filter | 6 |
| 118 | canister, water level | 1A |
| 119 | filter, air | 10 |
| 122 | alcove | 3 |
| 123 | light | 3 |
| 124 | port, outlet, exhaust air | 3 |
| 125 | ozonator | 3 |
| 126 | oxygenator | 3 |
| 127 | pest control device, ultrasonic | 3 |
| 128 | heater, electric | 3 |
| 129 | gold plating | 1 |
| 130 | sensor, upper vaporization tank | 12 |
| 131 | sensor, lower vaporization tank | 12 |
| 132 | tube, external water to vaporization tank | 12 |
| 133 | element, second heating | 12 |
| 134 | keypad | 3 |
| 136 | filter, air | 3 |
| 138 | panel, display | 3 |

Figure 1:
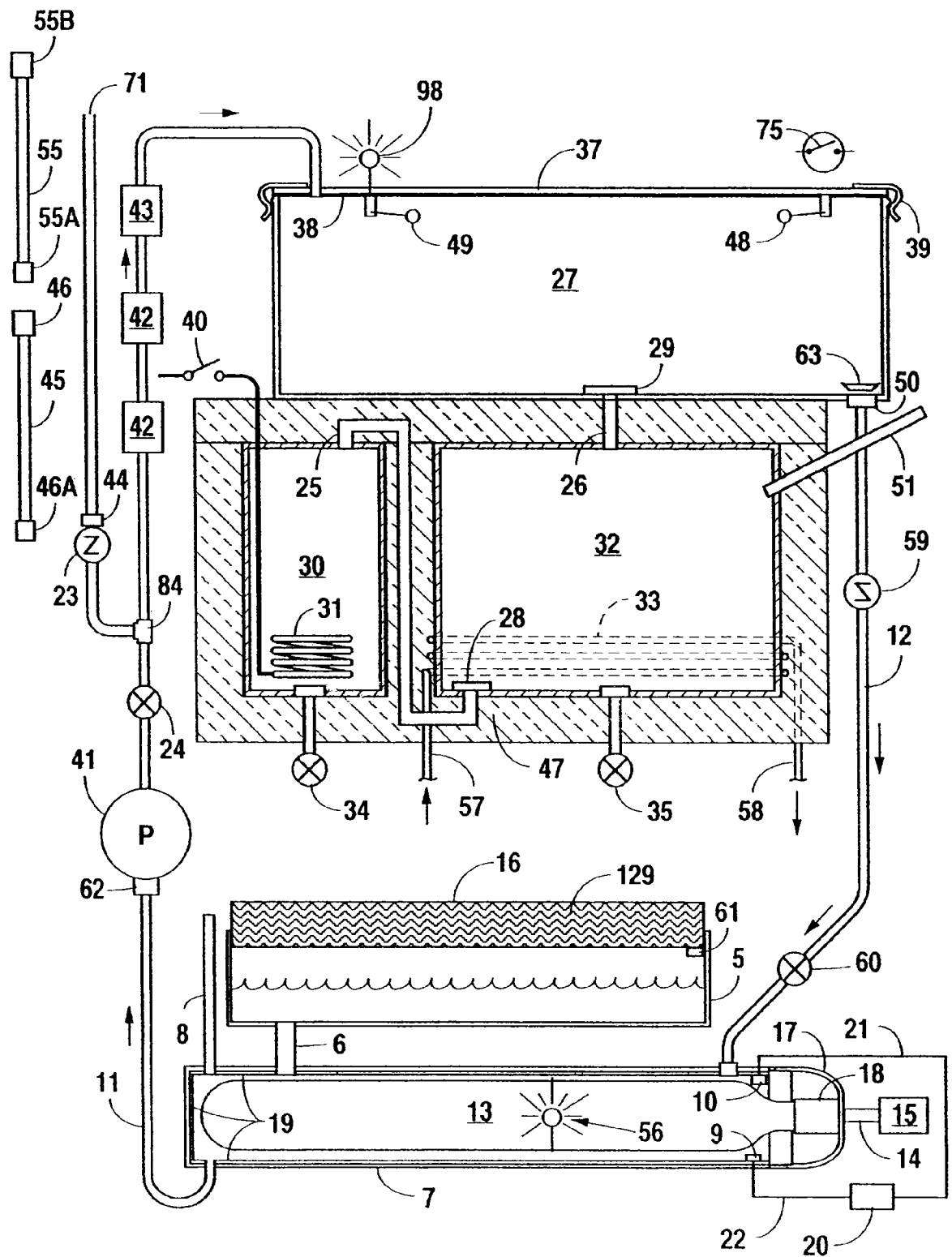
FIG. 1 is a schematic flow diagram of an embodiment of a system of the present invention to UV treat, filter, mineralize, medicinize/treat and further recirculate pressurized, potable water.

Operation of the present invention, as in FIG. 1, is initially controlled by a manually operated on/off switch 75 located on the housing. An electronically-operated on/off switch may be utilized in conjuction with to turn off visual displays, or utilized alternatively to the manually operated on/off switch. A multi-speed fan control switch (not shown) is adjacent to the on/off switch on the housing.

As may be best seen in FIGS. 1 and 10, air entering the housing 1 first passes through a replaceable air filter 119 into a plenum 65 and across an optional, self-contained ionizing device (not shown). Air then is drawn across the film-coated, dew-forming surfaces of first evaporator 16 by a multi-speed intake fan assembly 2, which is controlled by the multi-speed fan control switch. Liquid condensate flows by gravity into a condensate collector 5, and then flows into the first end of a UV canister 7 through a tube 6. A vent tube 8 permits air in the UV canister 7 to be displaced by the liquid condensate (water). A sensor 61 is provided just below the rim of the condensate collector 5 to disable power to the refrigerant first compressor 52, thereby preventing first evaporator 16 from cooling the ambient air to its dewpoint to overflow the condensate collector 5. First condenser 4 is provided to remove heat extracted from the condensing water. Should airflow from first evaporator 16 over first condenser 4 insufficiently remove heat from first condenser 4, the low-pressure refrigerant line from a second compressor 53 may be placed in thermally-conductive relationship with first condenser 4 so as to remove additional heat. As may be seen in FIG. 1A, an alternative preferred embodiment provides for the UV canister 7 to be further sealed and disposable, and placed in a location convenient for changing of the UV bulb 13.

Figure 1A:
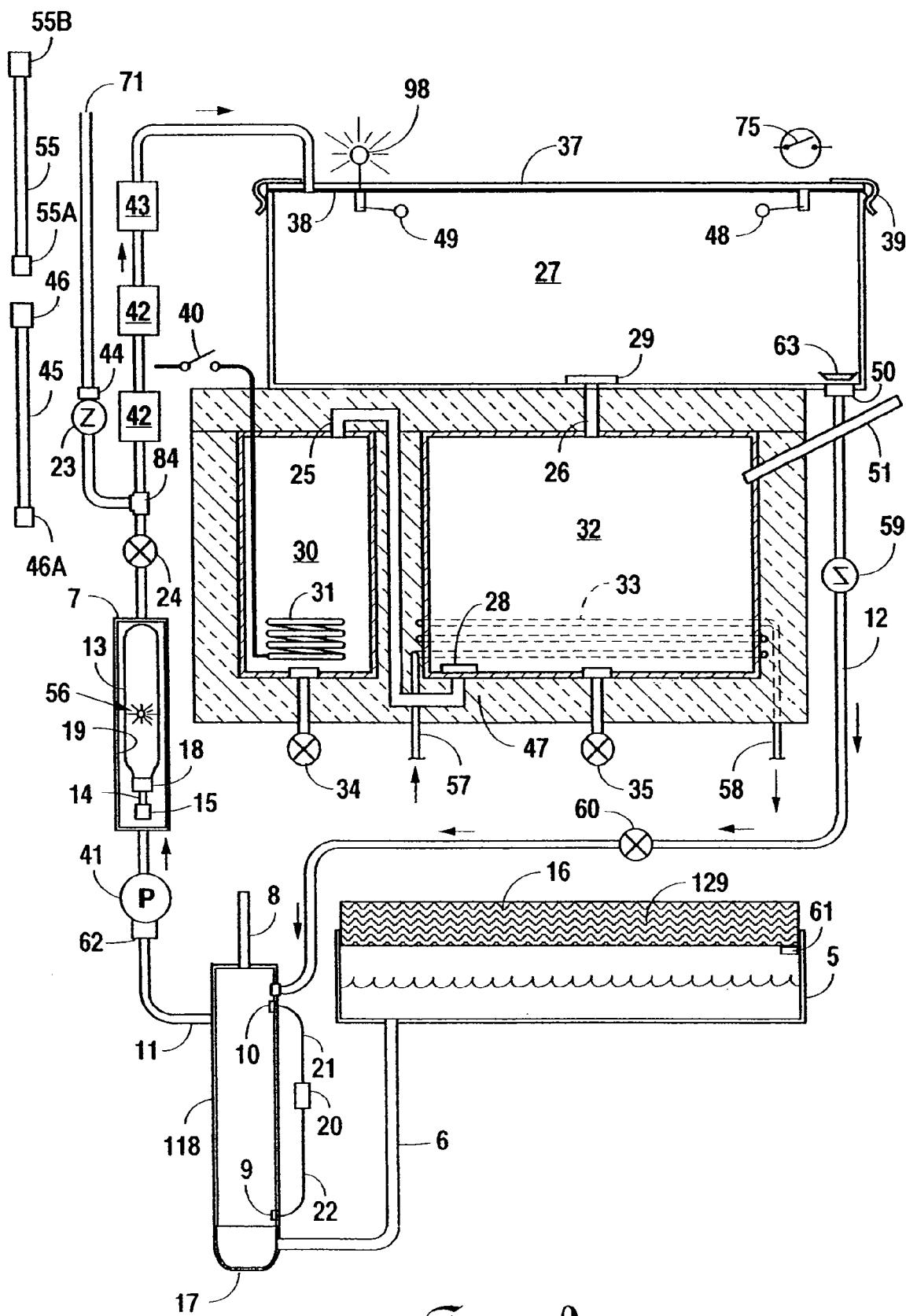
FIG. 1A is a schematic flow diagram of an embodiment of a system of the present invention to UV treat, filter, mineralize, medicinize/treat and further recirculate pressurized, potable water.
Figure 2:
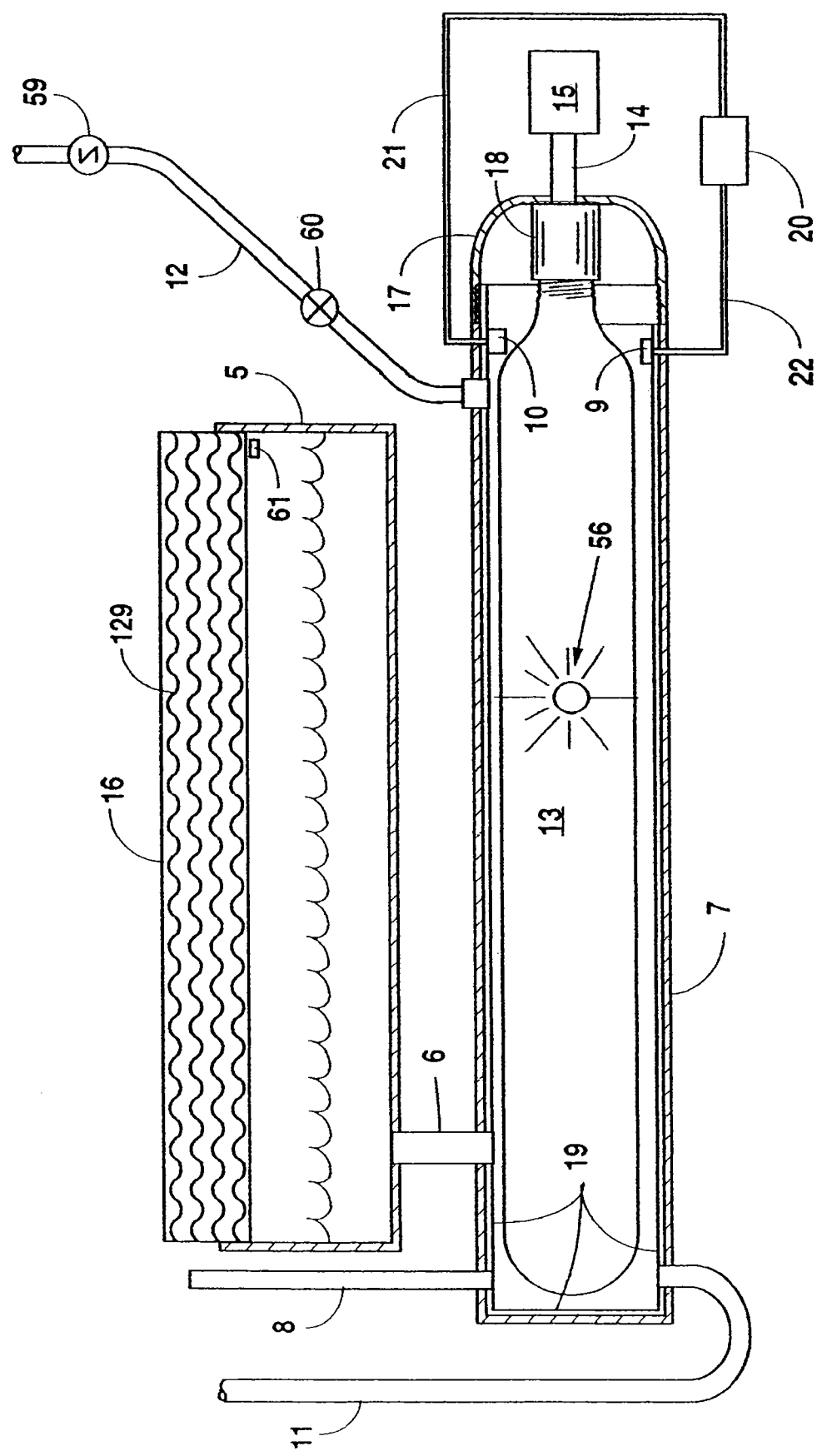
FIG. 2 is a detailed cut-away side view of a UV canister of the present invention, including UV bulb, mirrored surface, and electrical connections.

The UV canister 7 is designed so as to maximize the bacteria-killing effect of an optimal frequency of ultraviolet radiation, as may be seen in FIG. 2. Accordingly, the interior surfaces 19 of the canister are coated with reflective material, and the UV canister 7 is shaped around a UV bulb 13 so as to direct the liquid condensate into the optimum zone of bacteria destruction. The UV bulb 13 is held by UV bulb holder 18 and is powered by a ballast transformer 15, to which it is electrically connected by wires 14. This UV bulb 13 may be changed by removal of the canister cap 17. A pump 41 may be activated according to the volume of water within the UV canister 7 by means of a lower sensor 9 and an upper sensor 10. The lower sensor 9 and upper sensor 10 are both electrically connected to a pump relay switch 20 by wires 22 & 21. The pump relay switch 20 circuit closes and allows power to the pump 41 when both lower sensor 9 and upper sensor 10 are immersed in water. The pump 41 provides extra-gravitational pressure sufficient to pull water from the second end of the UV canister 7 through a sediment screen 62. The UV canister 7, sediment screen 62 and pump 41 fluidly communicate via a fluid transfer tube 11. A check valve 24 is placed serially with respect to the pump 41 and UV canister 7 to prevent reversal of water flow when the pump 41 is deactivated. A transparent port 56 is built into the UV canister 7 to serve as an UV indicator. As shown in FIG. 1A, the alternative preferred embodiment comprising a sealed, disposable UV canister 7 provides a separate water level canister 118 to house the sensors 9 and 10 for activation of the pump 41.

The pump 41 is preferably self-priming. The pump 41 forces water through a solid-core charcoal filter 42, and an mineralizing cartridge 43 into a storage tank 27. The pump 41, solid-core charcoal filter 42, mineralizing cartridge 43 for adding minerals to the purified water, and a storage tank lid 37 fluidly communicate via a fluid transfer tube 11. The storage tank lid 37 is further attached to the storage tank 27 by releasable, lockable clasps 39, and is sealed to storage tank 27 by means of a gasket 38 sandwiched between storage tank lid 37 and storage tank 27. The storage tank lid 37 is provided with an overflow float switch 48 that will disallow power to the refrigerant compressor (not shown) when the level of the water in the storage tank 27 approaches the attached storage tank lid 37, thereby stopping water condensation on first evaporator 16. The storage tank lid 37 is further provided with a second overflow float switch 49 that will allow illumination of indicator light 98 located on the display panel 138 in the event that the level of the water in the storage tank 27 approaches the attached storage tank lid 37.

Water from the storage tank 27 flows by gravity through a self-sealing gasket 29 and through a stainless steel tube 26 into a cold water tank 32. The water may then be chilled within the cold water tank 32 to a temperature within a range of approximately 4 C to approximately 12 C by the low-pressure second evaporator refrigerant coil 33 coiled around the cold water tank 32 and fluidly connected to refrigerant second compressor 53 at an cold-water tank 32 refrigerant coil 33 ingress line 57 and an cold water tank 32 refrigerant coil 33 egress line 58. The water may be further gravity dispensed outside the housing 1 by means of a spigot 35. Energy dissipation from cold water tank 32 is decreased by insulation 47. Additionally, a securable tube 51 is sealingly connected to the cold water tank 32 through the surrounding insulation 47 to permit direct introduction of medicines and/or vitamins into the cold water tank 32. Insulation (not shown) is placed around the secondary cooling device cold refrigerant lines to reduce or eliminate moisture "sweating" and buildup. Such insulation may similarly be placed on both hot and cold refrigerant lines to reduce unwanted heat transfer. Second condenser 74 provides an additional means, air-cooled by fan 77, for discharging heat from second compressor 53.

Water from the cold water tank 32 flows by gravity through a self-sealing gasket 28 and through a tube 25 into a hot water tank 30. The water may then be heated within the hot water tank 30 to a temperature within a range of approximately 75 C to approximately 91 C by providing electrical power via switch 40 to heating element 31. The water may be further gravity dispensed outside the housing 1 by means of a child-proof spigot 34. Energy dissipation from hot water tank 30 is decreased by insulation 47. The temperature of both hot and cold water is displayed on a display panel 138.

As in FIGS. 1 and 3, for the preferred embodiment, ambient temperature water is dispensed from the hot water tank 30 via the child-proof spigot 34 when the heating element 31 is not provided with electrical power. A display panel 138 connected to temperature sensing means (not shown) is provided to display the temperature of the water in the hot water tank 30. Enabling the selective powering of the heating element 31 can make maintenance of nearby cold-water tank 32 temperatures more efficient. Disposable liquid containers, e.g., paper cups, suitable for cold water, are provided from attached dispenser (not shown) mounted on the side of the housing.

The liquid condensate is passed through an oxygenator 126 prior to introduction into the storage tank 27, in order to healthfully introduce oxygen into the water. A quick-disconnect tube 45 may be attached at quick-disconnect 44 to direct water from a full storage tank 27 into external containers.

Water in the storage tank 27 is recirculated through the UV canister 7 through connector 50 and a fluid transfer tube 12. Placed serially in fluid communication via fluid transfer line 12 between the storage tank 27 and the UV canister 7 is a solenoid valve 59 that prevents flow of water from the storage tank 27 to the UV canister 7 unless electrical power is supplied to the solenoid valve 59. This prevents water in storage tank 27 from draining if electrical power to the apparatus fails. Also placed serially in fluid communication via fluid transfer line 12 between the storage tank 27 and the UV canister 7 is a bleeder valve 60 that may be manually adjusted to regulate the volume of water flowing from storage tank 27 to the UV canister 7.

A major improvement in the design of the present invention is the provision of a computer-controlled flow rafter expansion valve 88, as in FIG. 4, physically installed in addition to the typically-provided refrigeration expansion valve, but utilized in the alternative to encourage freezing of the condensate on the first evaporator 16 when the ambient air is at a low temperature but is still humid. The present invention is further enabled to reverse the refrigerant flow, thus heating the first evaporator 16 to quickly thaw the frozen condensate to permit it to drip into the condensate collector 5. This cycle may be reversed quite rapidly to permit water to be extracted in atmospheric conditions, whereas a non-reversed refrigeration cycle will not function to extract water from ambient air. Devices in the prior art merely shut down the refrigerant cycle to allow the frozen condensate to thaw, rather than actively inducing freezing and thawing by use of a flow rafter expansion valve and reversal the refrigeration cycle. The freezing and thawing cycle is activated by an electronically-timed and activated switch circuitry (not shown), which adjusts the cycle timing to atmospheric conditions. Condensate collection may be increased in a number of ways, including use of an enlarged first evaporator 16, increased airflow over the first evaporator 16, and increased temperature of air flowing over the first evaporator 16. Accordingly, an electrical heater 128 as in FIG. 3 may be placed upstream of first evaporator 16 to heat the low temperature ambient air passing over first evaporator 16. Heat from first condenser 4 is removed by air passing through the first evaporator 16 surfaces and thence over the first condenser 4 surfaces. For cooling of the first condenser 4 surfaces when the freeze/thaw cycle of the evaporator is active and the first evaporator 16 is clogged with ice, a separate multi-speed fan 3 pulls ambient air through air filter 136 for passage over first condenser 4, as in FIG. 10. Further provided for the purpose of cooling first condenser 4 is the low pressure refrigerant line (shown as heat exchanger 66) from the second compressor 53 in thermally conductive relationship to first condenser 4.

Figure 5:
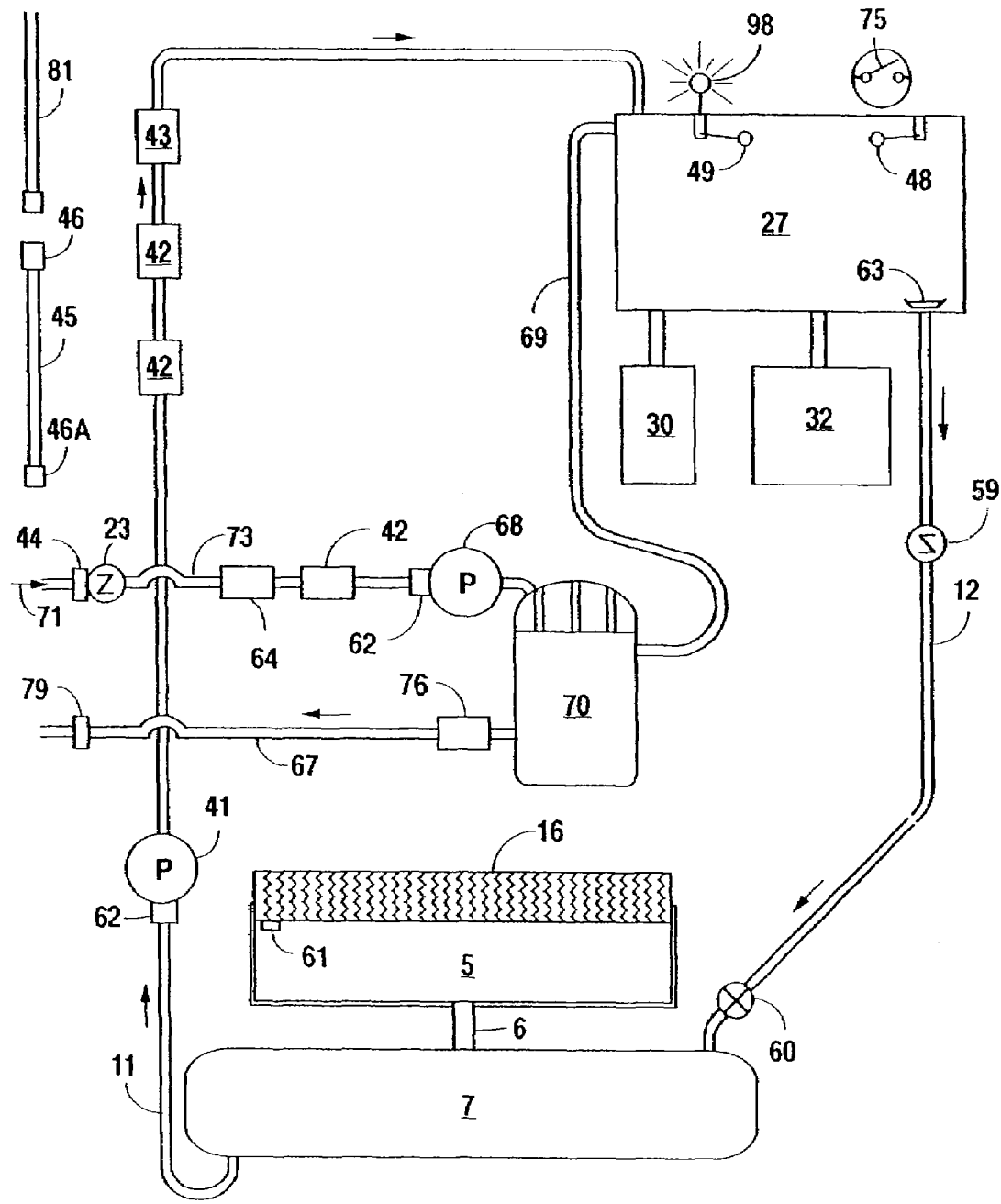
FIG. 5 is a schematic flow diagram of an embodiment of a system of the present invention utilizing a reverse-osmosis membrane filter as a water filtration means where waste water from the membrane filter is discarded.

The apparatus is equipped to accept liquid water from an external source, such as a municipal water supply, as in FIG. 5. Accordingly, fluid transfer tube 11 is fitted with a tee 84 to permit fluid communication of the apparatus with the external water source. A solenoid valve 23 is provided to prevent water flow through the external water source side of the tee 84 absent electrical power by way of low water sensor 63 provided at the inside bottom of the storage tank 27. At the external water source side of the solenoid valve 23 is a female quick-disconnect fitting 44 to permit easy coupling and uncoupling of external water source tube 71. A more convenient alternative embodiment provides for a dual-purpose tube 45 adapted with a female faucet fitting 46A at one end for coupling the tube 45 with a standard household faucet and a male quick-disconnect fitting 46 for coupling the tube 45 with the female quick-disconnect fitting 44. The externally-supplied water is passed through the tee 84 through the solid core charcoal filter 42 via the fluid transfer tube 11 in the direction of the storage tank. The check valve 24 prevents water from flowing toward the UV canister 7.

In an alternative preferred embodiment, the externally-supplied water may be directed through a reverse-osmosis membrane filter 70, as in FIGS. 5 and 11, which in turn simultaneously directs filtered water through fluid transfer tube 69 into storage tank 27 and waste water through fluid transfer tube 67 and drain tube 81 connected to the system at quick-disconnect 79 into a drain for disposal. Quick disconnect fitting 79 is provided to permit rapid coupling and uncoupling of the wastewater drain tube 81. In this membrane filter 70 embodiment, a solenoid valve 23 is provided to prevent water flow through the fluid transfer tube 73 to the membrane filter 70 absent electrical power by way of low water sensor 63 provided at the inside bottom of the storage tank 27. At the external water source side of the solenoid valve 23 is a female quick-disconnect fitting 44 to permit easy, coupling and uncoupling of external water source tube 71. A fluidly communicating screen 64 is further serially provided between the solenoid valve 23 and a booster pump 68 to remove suspended particulates from the external water. A fluidly communicating sand/sediment filter 115 and pre-filter 64 are further serially provided between the booster pump 68 and membrane filter 70 to remove heavy metals and VOC's from the external water. The waste water from the membrane filter 70 is directed via a fluid transfer tube 67 through a flow restrictor 76 to assist in maintaining a constant pressure within the membrane filter 70, and thence into the drain.

Alternatively, the waste water from the membrane filter 70 may be recycled, as in FIG. 6. In this embodiment, an additional recycle tank 107 is provided in serial fluid communication with the booster pump 68, through which external water is directed after passage through a solenoid 23 and a solenoid 111. Maximum water level in the recycle tank 107 is limited by an upper float sensor 112 to prevent the recycle tank 107 from overfilling, and minimum low water level is sensed by a lower float sensor 113. When the water level in the storage tank 27 decreases sufficiently to close the circuit of the sensor 63, the sensor 63 sends an electrical signal to a solenoid 111 to permit water to flow through the solenoid 111 into the recycle tank 107. Simultaneously, an electrical signal is sent to an external means (not shown) for indicating the status of the sensor 63. An operator of the present invention may then manually operate the switch 75 to send an electrical signal to the solenoid 23 to permit water to flow through it. When the water level in the recycle tank 107 rises sufficiently to close the sensor 112 circuitry, an electrical signal is sent both to the solenoid 111 to shut off external water flow and to activate the booster pump 68. The booster pump 68 draws water through the screen 62 and directs water through the sand/sediment filter 115 and pre-filter 64 into the membrane filter 70. The membrane-filtered water is then directed through tube 69, post-filter 116, and post-filter check valve 117 into the storage tank 27, while the waste water from the membrane filter is simultaneously discharged through wastewater outlet tube 67 through the waste water flow restrictor 76 and check valve 114 back into the recycle tank 107 for re-entry into booster pump 68 for further membrane filtration. The cycle of waste water returning to the recycle tank 107 continues until the water level in the recycle tank decreases sufficiently to close the circuit of the lower float sensor 113, which sensor 113 in turn de-activates the booster pump 68. Only when the lower float sensor 113 is closed will the booster pump 68 de-activate; the opening of the upper float sensor 112 by decreasing water level is the means by which the solenoid 111 is re-opened to permit additional external water to flow into the recycle tank 107, thereby raising the water level to engage the sensor 112 to thus activate the pump 68. Further manual operation of the switch 75 will close the solenoid 23, thus preventing additional water from flowing through the solenoid 111, and the waste-waster recycling process will continue until the water level in the recycle tank 107 decreases sufficiently to shut off the booster pump 68. The float switch 48 in the storage tank 27 serves as a master electrical override, shutting down the pump 68 and closing the solenoid 111 when the water level in the storage tank 27 rises sufficiently to engage the float switch 48.

A further alternative waste water recycling embodiment provides for automatic introduction of external water into the recycle tank 107. In this alternative embodiment, the apparatus is semi-permanently connected to an external water source, and the switch 75 is initially operated to open the solenoid 23. Thereafter, the filling of the recycle tank 107, recycling of wastewater, and discharge of pure water into the storage tank 27 takes place as described automatically, without many need to further operate the switch 75.

Figure 12:
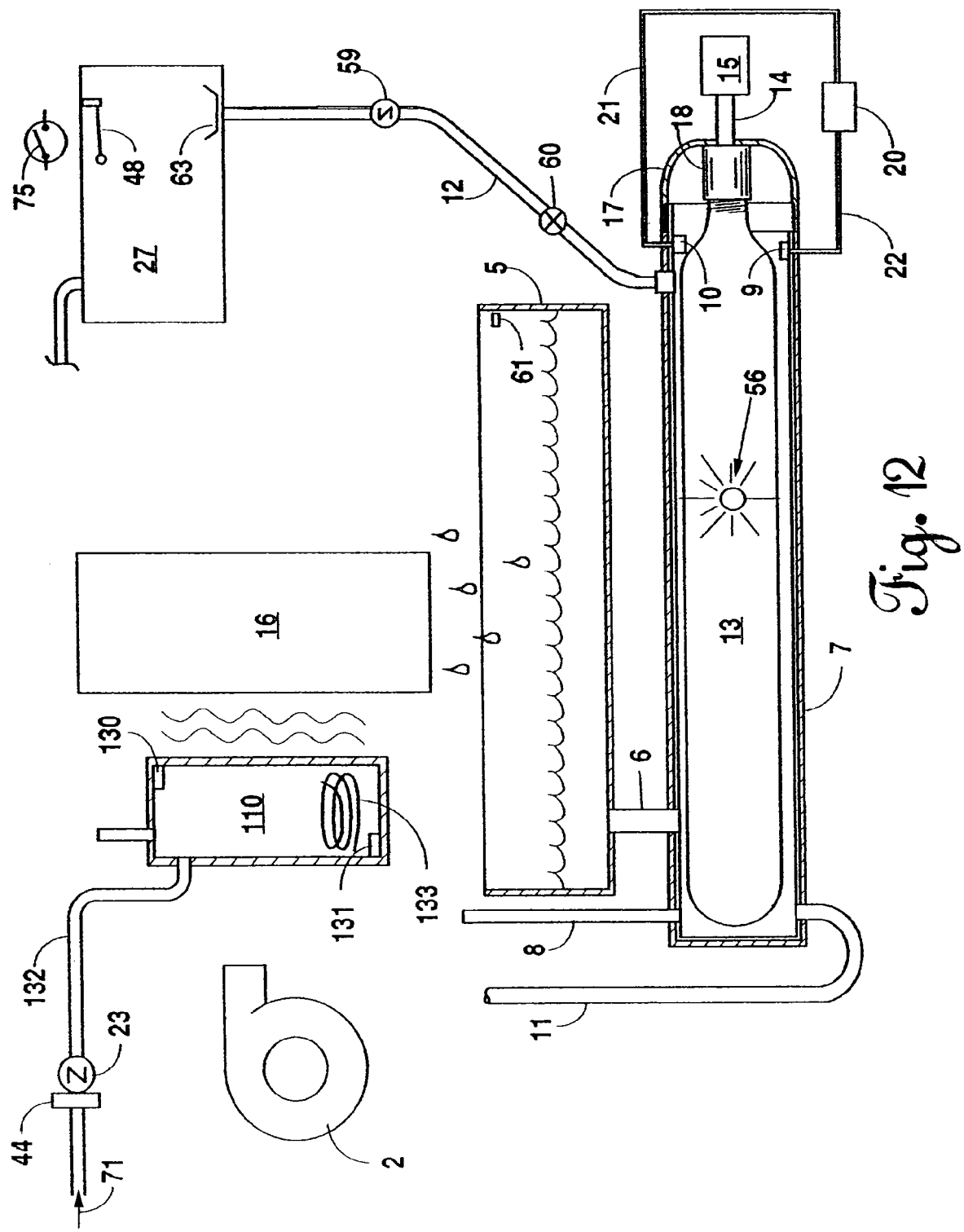
FIG. 12 is a schematic flow diagram of an alternate preferred embodiment of the present invention utilizing a vaporization tank wherein impure external water may be vaporized for subsequent passage over the dew-forming surfaces.

In an alternative preferred embodiment not having a membrane filter, impure water is purified by vaporization, as shown in FIG. 12. If, upon inspection, the storage tank 27 is empty, the switch 75 may be operated so as to open the solenoid 23 to permit impure externally-supplied water to be sent from an external water source through a tube 133 directly into a vaporization tank 110 for vaporization by the second heating element 133. Operation of the switch 75 simultaneously permits electrical power to flow to the second heating element 133. The vaporization tank 110 is positioned with respect to the first evaporator 16 such that the steam from the vaporization tank 133 is passed over the dew-forming surfaces of the first evaporator 16 for condensation and passage into the condensate collector 5. The condensate is then sent through the UV canister 7 and other system components as in the preferred embodiment. An upper sensor 130 and a lower sensor 131 provide a means for controlling the water level within the vaporization tank 110. When the external water fills the vaporization tank 110 sufficiently to engage the upper sensor 130, the upper sensor 130 sends an electrical signal to close the solenoid 23, thus shutting off the external water. When the water level in the vaporization tank 110 decreases sufficiently to engage the lower sensor 131, the lower sensor 131 sends an electrical signal to open the solenoid 23, thus permitting water to flow into the vaporization tank. The cycle of filling the hot water tank 30 and vaporizing impure water may be continued until manually shut off by operation of the switch 75 so as to close the solenoid 23 and remove electrical power from the second heating element 133. If not the solenoid 23 is not closed by manual operation of the switch 75, the water level in the storage tank 27 will rise to engage the override sensor 48, thus closing the solenoid 23 and removing power from the second heating element 133.

The apparatus is further equipped to supply liquid condensate from the apparatus to a typical refrigerator ice-maker. Accordingly, a tube 55 is adapted with an ice-maker engaging quick-disconnect fitting 55B to permit coupling of the tube 55 with the refrigerator ice-maker, and a male quick-disconnect fitting 55A for coupling of the tube 55 with the female quick-disconnect fitting 44. Solenoid 23 is provided with electrical power from a timer-controlled power switch 75 to permit flow of water through the external water source side of the tee 84. The pump 41 is activated to push water through the tee 84 into the ice-maker. The water is discouraged from flowing through the fluid transfer tube 11 into the storage tank 27 by an intervening solid core charcoal filter 42 and an mineralizing cartridge 43.

Noise from the present invention is abated primarily by two features: multi-speed squirrel cage fans 2 & 3 and a hermetically sealed compressor cover 85 further insulated by insulation 90, as may be seen in FIG. 10. The present invention permits use of such a sealed compressor cover 85 by utilizing the extra cooling capacity of the water chiller second evaporator coil 33. A section of the refrigerant line coil 83 of second evaporator coil 33 is wrapped around first compressor 52 to absorb heat generated by first compressor 52, thus permitting a compressor cover 85 to sealingly surround first compressor 52 without causing the first compressor 52 to overheat. In an alternative preferred embodiment, a separate fluid-carrying coil may be wrapped around the first compressor 52 for transportation of heat from the first compressor 52 to an external radiator (not shown), much like that used for an automobile engine.

As may be seen in FIG. 11, a smaller, sink-top version of the apparatus generally includes all of the benefits of the larger embodiment inside of a smaller cabinet 89. A heat exchanger 66 is provided in conjunction with a first evaporator 16 over which air is passed to condense water. The condensate gravity feeds into a condensate collector 5, and then drains via a fluid transfer tube 6 into the UV canister 7. When sufficient condensate has entered the UV canister 7, a pump 41 is activated to direct water through a series of filters 64 & 42 and a mineralization canister 43 into a storage tank 27. From the storage tank 27, ambient temperature water may be dispensed through a spigot 91. For cold water dispensation from a spigot 35, condensate flows through the tube 95 into a tank 94 containing a Peltier-effect ice finger 93 to chill the water, which ice finger effect and use is described U.S. Pat. No. 6,182,453 and incorporated herein by reference. The water level in the storage tank is generally controlled by a high water level switch 48, which removes electrical power from either the first compressor 52 to cease water generation or the booster pump 68, and a low water level switch 63, which can open a solenoid 23 to permit external water to flow into the system. External water is introduced into the system, through a tube 45 (not shown in FIG. 11) attached by mating quick-disconnect fitting 46 to fitting 44. The other end of tube 45 attaches to a typical household faucet via a fitting 46A. A timing switch 75 may be used to open a solenoid valve 23 and provide power to the booster pump 68 to direct water into the membrane filter 70. The external water is directed into the storage tank 27 via tube 69 from the membrane filter 70. Waste water flow through the discharge tube 92 from the membrane filter 70 is controlled by a flow restrictor 76 to maintain water pressure in the membrane filter 70. When the water flowing from the membrane filter 70 fills up the storage tank 27, the high-water level switch 48 overrides the switch 75 to cut off electrical power to the solenoid 23 and the booster pump 68. The solenoid 59 remains open so long as electrical power is supplied to the apparatus; when such power is cut off, it closes, thereby preventing drainage of the storage tank 27. By opening a flow controller 60 and activating the pump 41, water can begin circulating from the full storage tank 27 through the UV canister 7, filter series 64 & 42, the mineralization canister 43, and the pump 41 back into the storage tank 27, all via fluid transfer tubes 11 & 12. The volume of circulation flow is controlled by a flow controller 60. A solenoid valve 59 is provided to prevent draining of the storage tank 27 in the event that electrical power to the apparatus is cut off. An alternative sink-top embodiment provides for placement of the UV bulb 13 within the storage tank 27 for space conservation (not shown in Figures).

The present invention may be further integrated into a window air-conditioning (A/C) system 78, as in FIGS. 7, 8 and 9. In this embodiment, the evaporator of the A/C unit coincides with the dew-forming surfaces of the first evaporator 16 of the present invention. The embodiment of FIG. 7 utilizes a membrane filter 70 for filtering the condensate from the A/C evaporator after it passes through the UV canister 7. This embodiment is also adapted to receive externally-supplied water. The embodiment of FIG. 8 utilizes a solid-core charcoal filter 42 for filtering the condensate from the A/C evaporator after it passes through the UV canister 7. The condensate in both embodiments is then passed into the storage tank 27 for further external dispensation through a spigot 91 or direction into a tank 94 for chilling by Peltier ice finger for external dispensation through separate spigot 35. Recirculation as provided in the free-standing apparatus is also provided in the A/C unit embodiments. These air-conditioning unit embodiment may be adapted to fit within an enlarged air conditioning unit platform 102 to be moved with the platform 102, or may simply be attachable to a window air-conditioning unit 78 and moved to a different such unit 78 as desired. Before movement of the embodiment to a different A/C unit 78, the UV canister 7 may be drained via drain tube 104 through a drain valve 105.

Additional Features. The housing is fitted with an ozone generator 125 adjacent to the departing air stream to further improve air quality. The housing also contains a warbling, ultrasonic pest-control device 127 which operates continuously. To provide for mobility of alternative embodiments of the apparatus, four casters or rollers (not shown) suitable to the weight and size of the present invention may be affixed to the four corners of the lower side of the base of the housing. To further provide for mobility of alternative embodiments of the present invention over uneven surfaces, two enlarged wheels of up to 5 inches diameter may be affixed to two adjacent corners of the lower side of the base of the housing. Carrying handles (not shown), suitable to the weight and size of the present invention, may also be fixed, one on each side of the housing at a height appropriate for transport by two adults.

For further health benefit, the heat absorption systems of the present invention are assembled by use of lead-free solder to prevent contamination of the condensate with heavy metals.

As described in U.S. Pat. No. 6,182,453 and incorporated herein by reference, the system of the present invention is provided with various devices for automatically sequencing control operations, including integrated circuits and microprocessors adapted to receive sensor signals and activate operational functions, including safety-interlock functions, and related system components, all operations being activated according to a predetermined, logical control sequence. The present invention is further provided with devices for monitoring and/or visually displaying integrity, including sensors for on/off operation, ambient air humidity, fluid flow rate, fluid level, fluid pressure, head pressure, current flow, radiation intensity, operational frequency, temperature, elapsed time, cumulative flow volume, presence of small quantities of spilled liquid water, open or closed solenoid valve status, open or closed status of external water input ports, open or closed status of external water-delivery ports, status of emergency water-input ports, and status of safety locks.

The present invention is enabled to operate as an air conditioning apparatus. That is, the fans and electrical heater subsystem of the present invention may be operated independently of the water-generating subsystem to heat the ambient air of a room.

OPERATION OF THE PRESENT INVENTION

Incoming air is filtered by a known depth-screen filter assembly or an electrostatic filter assembly. If desired for operation in a home or office, an ozone generator can be included; this addition allows the present invention to function as a charged-particle generator and room-air purifier. Additionally, an oxygenator can be included to introduce oxygen into the purified water.

Condensate collected from the air flow across the first evaporator flows downward by gravity to a collector for condensate and is further conducted by gravity flow into a UV canister. In this UV canister is a set of sensors which actuates the pump when the UV canister is full. The condensate is conducted through the UV canister for exposure to an ultraviolet germicidal light from a UV bulb. Recirculation of the condensate through the UV canister and VOC filter is accomplished by activating the recirculation pump at least once at predetermined time intervals in the range 1-12 hours, for a predefined flow or time duration in the range 1-50 times the tank volume or 1-200 minutes at a specific flow rate. By this repeated process, water is intermittently and continually recirculated across the VOC filter and UV portions of the purification circuit whenever the water generator is in use. The flow duration may be defined by the volume circulated or by time. An indicator port on the exterior of the UV canister visible through the housing confirms proper operation of the UV canister 7.

The condensate is pumped under positive pressure through a VOC purification filter assembly capable of NSF-53 purification and then pumped into a storage tank made of plastic or stainless steel as is common for food-service contact. The cold-water tank, into which condensate is directly gravity fed from the storage tank, may be encased by a form-fitted insulation jacket made of a nontoxic material, such as polymer foam. The water from the cold-water tank further flows by gravity into the hot-water tank, which has a child-proof fluid delivery spigot. The cold-water tank likewise has a fluid delivery spigot. The storage tank in one embodiment is removable for cleaning. The fluid delivery spigots are at an ergonomically-correct level above the floor, making water easily accessible for children or persons in wheelchairs. An holder (not shown) for disposable cold-liquid containers is shown in close proximity to the fluid delivery controls.

The storage tank is provided with a storage tank lid which may be attached to the storage tank by means of releasable, lockable clasps. A gasket provides a seal between the storage tank lid and the storage tank. The storage tank is further sealed to the cold-water tank inlet tube by means of a self-sealing gasket. The recirculation fluid transfer tube is attached to the storage tank via a quick-disconnect fitting. These features permit the storage tank to be easily lifted away from the apparatus for cleaning.

Chilling of the collected purified water in the cold water tank to a nominal temperature of 5 C is accomplished by adding a secondary cooling device, second evaporator. The coil of second evaporator is placed between the exterior of the cold water tank and the surrounding insulation.

Heating of the water to a nominal temperature of 75 C is accomplished by heating element inside of the hot-water tank. Water is gravity-fed into the hot water tank from the cold-water tank through a tube. Hot water is dispensed through the child-proof fluid delivery spigot, which is connected to the hot water tank.

In the bottom of the storage tank is a low condensate switch. If there is low water in the storage tank, an electrical signal is either sent to the pump or, if the apparatus is connected to an external water source, sent to the inlet water solenoid which opens, letting water pressurize the system. The external water passed through a solid core filter, or alternatively through a reverse-osmosis membrane filter, before introduction into the storage tank. Thereafter, condensate from the storage tank or municipal water can be automatically recirculated through the UV canister, and waste water from the membrane filter is recycled for repeated membrane filtration. The water level float switch turns off the water flow when the water level in the storage tank rises sufficiently to trigger it. Remote dispensers as well as municipal water sources are attached by quick-disconnect fittings.

For purification of water by vaporization, external water is permitted to flow into the vaporization tank until a sensor near the inside top of the vaporization tank sends a signal to a solenoid to cut off the flow of water. The heating element within the vaporization tank vaporizes the water, which then passes over the dew-forming surfaces. Condensation drips into the condensate collector and into the water treatment stages of the apparatus. When the level of water within the vaporization tank decreases sufficiently to trigger the sensor near the inside bottom of the vaporization tank, the solenoid opens to allow more water into the hot water tank. The cycle of filling the vaporization tank and emptying it by vaporization of the water is continued until either manually ended, or shut off by the storage tank override/overflow switch.

During unfavorable times for producing condensate, the first compressor is enabled to activate until it frosts over and then deactivate until the frost melts, producing condensate. When there is sufficient humidity as indicated by a humidistat but low temperatures, the first evaporator will freeze. In particular, the typical refrigeration expansion valve is bypassed, and the flow rafter is utilized to further decrease the pressure in the low-pressure cold refrigeration line. Upon freezing of the evaporator and condensate, the refrigerant cycle is reversed, thus rapidly heating the evaporator-turned-condenser so as to melt the condensate. When the thawed condensate has passed into the condensate collector, the refrigeration cycle reverses again to cool the evaporator and freeze condensate collected from passing air. This cycle is computer-controlled for optimal water production. In this way, water may be generated at a higher rate than that produced by use of hot-gas bypass or mere on-off-on action of the compressor. Further, during extended absences, recirculation switch (not shown) activates recirculation of water from the storage tank through the UV canister and the water filter as timed by pump timer (not shown). The present invention is connected to various dispensers remotely located through tee connectors and quick disconnect fittings. An easily cleaned, unitary surface, operation control panel contains various indicator displays electrically or audibly indicating system operation.

Further, a humidity/temperature water production chart (not shown) showing the expected water production at various combinations of temperature and humidity can be created according to testing conducted in a controlled environmental test chamber. This graph can then be posted on the outside of the housing to show expected water production.

The invention claimed is:

1. An apparatus for producing potable water comprising:
   (a) a portable enclosure having an air inlet port and an air outlet port;
   (b) a fan disposed within said enclosure to move air from said air inlet port to said air outlet port;
   (c) an air filter disposed to filter said air entering said enclosure through said air inlet port;
   (d) a water condenser having a dew-forming surface on which water vapor may condense from said air to form condensate;
   (e) a bacteriostat disposed to receive said condensate by gravity flow;
   (f) a pump disposed to pull said condensate from said bacteriostat and force said condensate upward through a water filter and into a storage tank; and
   (g) a cold water tank disposed to receive said condensate from said storage tank by gravity flow, said cold water tank having a dispenser for dispensing said condensate from said cold water tank.

2. The apparatus of claim 1 wherein said bacteriostat comprises an ozone generator.

3. The apparatus of claim 1 wherein said bacteriostat comprises a source of ultraviolet light.

4. The apparatus of claim 3 wherein said source of ultraviolet light comprises:
   (a) a canister having a reflective interior surface; and (b) a bulb at least partially disposed within said canister, said bulb being capable of radiating ultraviolet light through said condensate toward said reflective interior surface.

5. The apparatus of claim 4 further comprising a sensor adaptable for activating said pump upon sensing a volume of water.

6. The apparatus of claim 1 further comprising a conduit in fluid communication with said storage tank and said bacteriostat, said conduit being adaptable for recirculating said condensate from said storage tank through said bacteriostat and through said water filter.

7. The apparatus of claim 1 wherein said water condenser comprises a compressor, an expansion valve, and refrigerant, and wherein said compressor and said expansion valve are connected to permit flow of said refrigerant in a closed loop.

8. The apparatus of claim 7 wherein said water condenser further comprises a flow reverser for reversing the flow direction of said refrigerant in said water condenser.

9. The apparatus of claim 8 wherein said flow reverser comprises a flow rafter expansion valve.

10. The apparatus of claim 1 wherein said water condenser comprises an evaporator having a quickly reversible refrigeration cycle for alternately freezing and thawing the evaporator to produce said condensate.

11. The apparatus of claim 10 wherein said evaporator comprises a flow rafter expansion valve.

12. The apparatus of claim 1 further comprising a vaporization tank having a heating element adaptable for producing steam from impure water, wherein said steam condenses on said dew-forming surface to form said condensate.

13. The apparatus of claim 1 wherein said water filter comprises a solid-core charcoal filter.

14. The apparatus of claim 1 wherein said water filter comprises a reverse-osmosis membrane filter.

15. The apparatus of claim 1 further comprising a hot water tank disposed to receive said condensate from said cold water tank, said hot water tank having a heating element adaptable for heating said condensate.

16. The apparatus of claim 1 further comprising a tube to permit direct introduction of medicines or vitamins into said cold water tank.

17. The apparatus of claim 16 further comprising a recirculation loop conduit in fluid connection with said storage tank for automatically recirculating water from said storage tank through said pump, said bacteriostat, and said water filter in a manner that effectively isolates medicinated or vitamin-treated water in said cold water tank.

18. The apparatus of claim 1 further comprising a Peltier-effect thermoelectric ice finger connected to said cold water tank.

19. The apparatus of claim 1 wherein said water condenser comprises a compressor, and wherein a water cooler connected to said cold water tank is adapted to absorb heat from said compressor so as to permit enclosure of said compressor within a hermetically sealed, insulated cover.

20. The apparatus of claim 15 wherein ambient temperature water may be dispensed from said hot water tank when said heating element is not provided with electrical power.

21. The apparatus of claim 15 further comprising a child-proof valve through which water may be externally dispensed.

22. The apparatus of claim 1 further comprising an inlet water line, operational controls, and related valves for admission of municipal water in the event that water cannot be generated from environmental air, said municipal water flowing via a discharge line through said water filter and said bacteriostat upon the opening of a dispenser.

23. The apparatus of claim 1 further comprising an inlet water line, operational controls, and related valves for admission of municipal water in the event that water cannot be generated from environmental air, said municipal water flowing via a discharge line through a booster pump, a non-membrane water filter, and a reverse osmosis membrane filter into said storage tank.

24. The apparatus of claim 1 further adapted to discharge purified water into a refrigerator-mounted ice-maker.

25. The apparatus of claim 1 wherein said dew-forming surface is plated with gold so as to increase the rate of heat transfer through said dew-forming surface.

26. The apparatus of claim 1 further comprising a mineralization canister through which the condensate is passed prior to external dispensing so as to add minerals to said condensate.

27. The apparatus of claim 1 further comprising an ozonator mounted upstream of said air filter to further assist in removing particulate matter from the intake air.

28. The apparatus of claim 1 further comprising an oxygenator through which the condensate is passed prior to external dispensing so as to introduce oxygen into said condensate.

29. The apparatus of claim 1 wherein said air filter is adapted to remove particulates of a diameter larger than 0.3 microns from said air.

30. The apparatus of claim 1 further adapted for integration with an air-conditioning unit wherein said dew-forming surface coincides with an evaporator of said air-conditioning unit.

31. The apparatus of claim 1 miniaturized into a counter-top embodiment so as to conserve space.

32. The apparatus of claim 1 further comprising an electrical heater to introduce heat into air passing over said water condenser.

33. The apparatus of claim 23 farther comprising a means for directing waste water from said membrane filter into water flowing into said membrane filter, thus recycling said waste water.

34. The apparatus of claim 4 wherein said canister is sealed and disposable.

35. The apparatus of claim 32 wherein said water condenser comprises a compressor, and wherein all electrical components other than said electrical heater, said compressor, and at least one transformer operate at a voltage less than approximately 35 volts so as to be "low voltage".

36. The apparatus of claim 12 further comprising an electrical heater to introduce heat into air passing over said water condenser, wherein said water condenser comprises a compressor, and wherein all electrical components other than said heating element, said electrical heater, said compressor, and at least one transformer operate at a voltage less than approximately 35 volts so as to be "low voltage".

37. The apparatus of claim 1 wherein said cold water tank comprises a refrigerant coil for chilling said condensate.

38. The apparatus of claim 15 wherein said hot water tank further comprises a second dispenser for dispensing hot water from said hot water tank.

39. An apparatus for producing potable water comprising:
(a) a portable enclosure having an air inlet port and an air outlet port;
(b) a fan disposed within said enclosure to move air from said air inlet port to said air outlet port;
(c) an air filter disposed to filter said air entering said enclosure through said air inlet port;

(d) a water condenser having a dew-forming surface on which water vapor may condense from said air to form condensate;

(e) a bacteriostat disposed to receive said condensate and kill bacteria in said condensate; and (f) a water filter disposed to receive said condensate and remove particles from said condensate;

wherein said water condenser comprises an evaporator having a quickly reversible refrigeration cycle for alternately freezing and thawing the evaporator to produce said condensate.

40. The apparatus of claim 39 wherein said water condenser comprises a flow rafter expansion valve.

41. An apparatus for producing potable water comprising:

(a) a vaporization tank comprising a heating element adaptable for producing steam from impure water;

(b) an evaporator positioned to receive said steam, said evaporator comprising at least one dew-forming surface on which said steam may condense to form condensate;

(c) a bacteriostat disposed to receive said condensate and kill bacteria in said condensate; and (d) a water filter disposed to receive said condensate and remove particles from said condensate.

42. The apparatus of claim 41 further comprising a storage tank for receiving said condensate.

43. The apparatus of claim 42 farther comprising a pump adapted for moving said condensate through said water filter and into said storage tank.

* * * * *